(12) United States Patent
Usuba

(10) Patent No.: US 8,196,836 B2
(45) Date of Patent: Jun. 12, 2012

(54) IMAGE PROCESSING APPARATUS, IMAGE PROCESSING METHOD AND COMPUTER-READABLE MEDIUM

(75) Inventor: Ryoko Usuba, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1020 days.

(21) Appl. No.: 12/163,190

(22) Filed: Jun. 27, 2008

(65) Prior Publication Data
US 2009/0001167 A1    Jan. 1, 2009

(30) Foreign Application Priority Data

Jun. 28, 2007 (JP) .................. 2007-170350
Apr. 9, 2008 (JP) .................. 2008-101471

(51) Int. Cl.
G06K 7/10 (2006.01)
G06K 19/06 (2006.01)
G06K 5/04 (2006.01)
G06K 9/32 (2006.01)
G06K 9/22 (2006.01)
G06K 7/14 (2006.01)
G06K 7/00 (2006.01)
G02B 26/10 (2006.01)

(52) U.S. Cl. ......... 235/462.16; 235/462.01; 235/462.08; 235/462.11; 235/462.25; 235/454; 235/435

(58) Field of Classification Search ............ 235/462.16, 235/462.08, 462.01, 462.11, 462.25, 454, 235/435

See application file for complete search history.

(56) References Cited

U.S. PATENT DOCUMENTS

| 3,916,154 | A  | * | 10/1975 | Hare et al. ............ | 235/462.07 |
| 5,134,272 | A  |   | 7/1992 | Tsuchiya et al. | |
| 5,767,497 | A  | * | 6/1998 | Lei ..................... | 235/462.12 |
| 5,801,369 | A  | * | 9/1998 | Akeda .................. | 235/462.16 |
| 5,821,520 | A  | * | 10/1998 | Mulla et al. ............ | 235/462.27 |
| 5,929,423 | A  | * | 7/1999 | Boersma et al. ........ | 235/462.16 |
| 6,059,187 | A  | * | 5/2000 | Sato et al. .............. | 235/462.16 |
| 6,073,847 | A  | * | 6/2000 | Reichenbach et al. ... | 235/462.12 |
| 6,357,660 | B1 | * | 3/2002 | Watanabe et al. ........ | 235/462.16 |
| 6,802,450 | B2 | * | 10/2004 | Cheung et al. .......... | 235/462.25 |
| 6,976,630 | B2 | * | 12/2005 | Miyazawa et al. ....... | 235/462.25 |
| 8,016,197 | B2 | * | 9/2011 | Furuyama et al. ....... | 235/462.1 |
| 2004/0164158 | A1 | * | 8/2004 | Miyazawa et al. ...... | 235/462.16 |
| 2004/0164160 | A1 | * | 8/2004 | Miyazawa et al. ...... | 235/462.16 |
| 2004/0164161 | A1 | * | 8/2004 | Iwaguchi et al. ........ | 235/462.16 |
| 2009/0078766 | A1 | * | 3/2009 | Furuyama et al. ........... | 235/454 |
| 2009/0167013 | A1 | * | 7/2009 | Horikoshi ................ | 283/81 |

FOREIGN PATENT DOCUMENTS

| JP | A-02-125381 | 5/1990 |
| JP | A-06-266879 | 9/1994 |
| JP | A-09-016701 | 1/1997 |
| JP | A-09-062763 | 3/1997 |

* cited by examiner

Primary Examiner — Daniel Walsh
(74) Attorney, Agent, or Firm — Oliff & Berridge, PLC

(57) ABSTRACT

An image processing apparatus includes a first detecting unit and a second detecting unit. The first detecting unit detects a leading end portion of an information image based on a first criterion and a ratio of a width of a certain white image area in the information image to a width of a black image area being detected prior to the certain white image area. The second detecting unit takes one of the black image areas and white image areas as an image area of interest and detects a portion, other than the leading end portion, of the information image based on a second criterion and at least one of ratios of a width of the image area of interest to widths of black and white image areas being detected prior to the image area of interest.

12 Claims, 18 Drawing Sheets

FIG. 4
ONE-DIMENSIONAL BARCODE
(A) CODE39
(B) NW7
(C) ITF
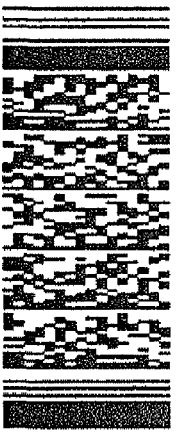
(F) CODE128
(D) CODE93
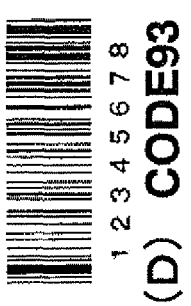
(E) JAN
STACK-TYPE TWO-DIMENSIONAL BARCODE
(G) CODE49
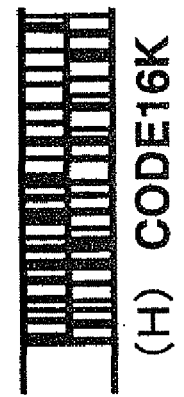
(H) CODE16K
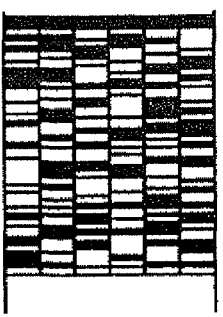
(I) PDF417

FIG. 5
(A)
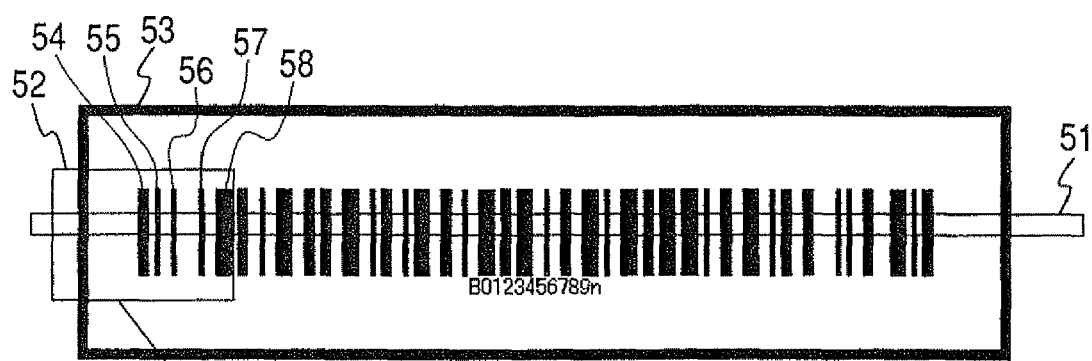
(B)
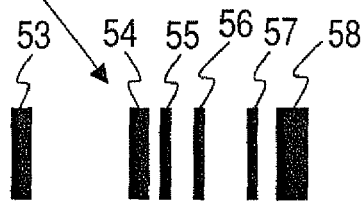

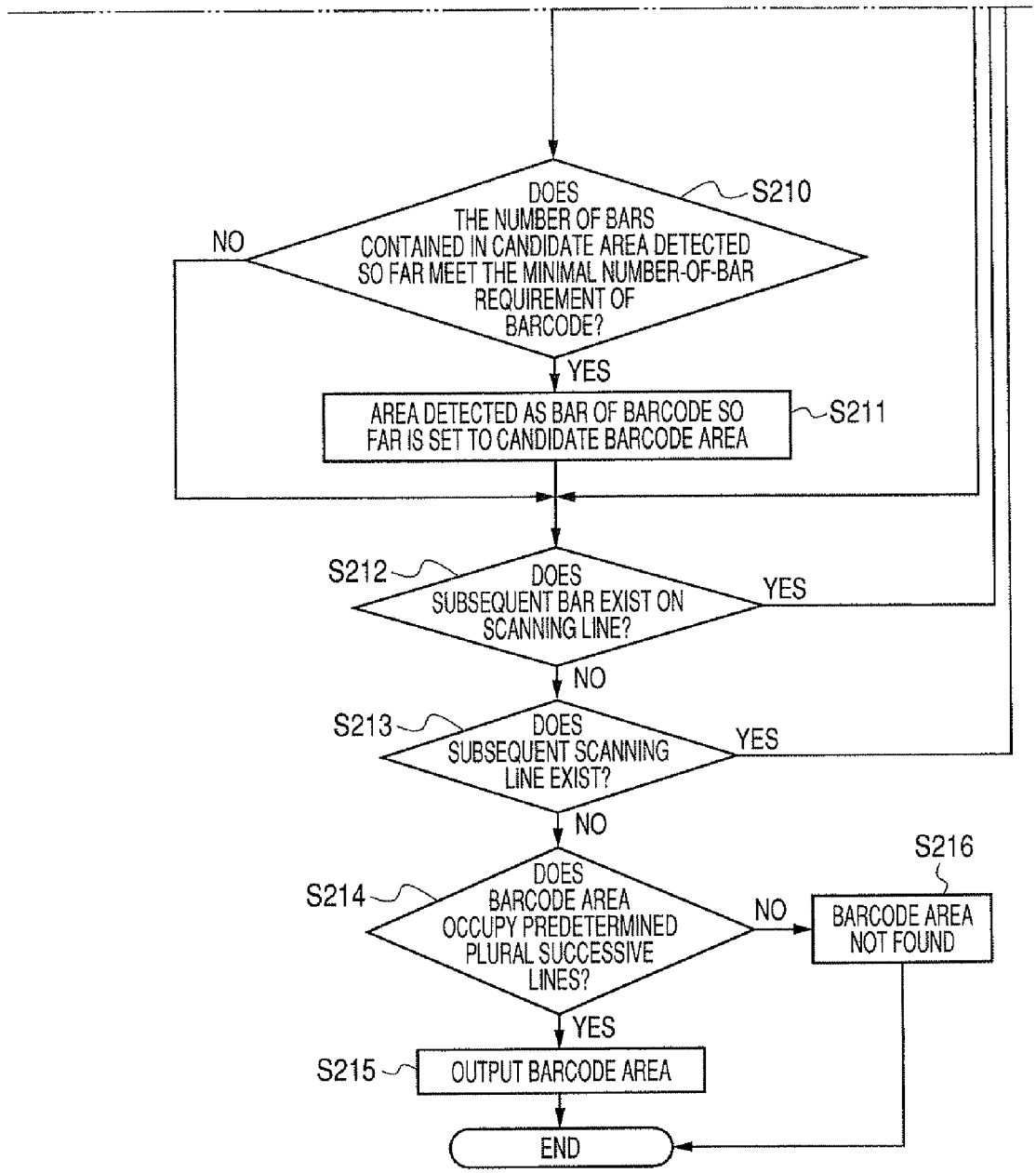

INFORMATION-IMAGE DETECTING MODULE

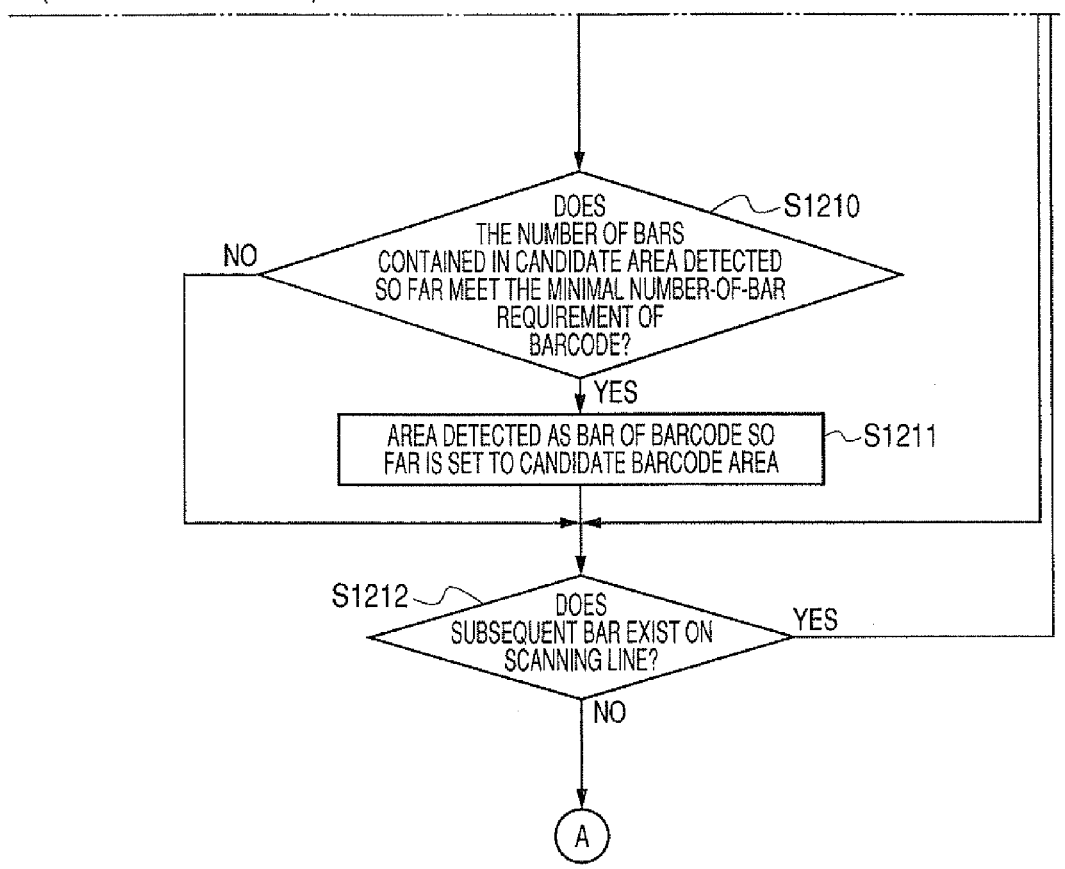

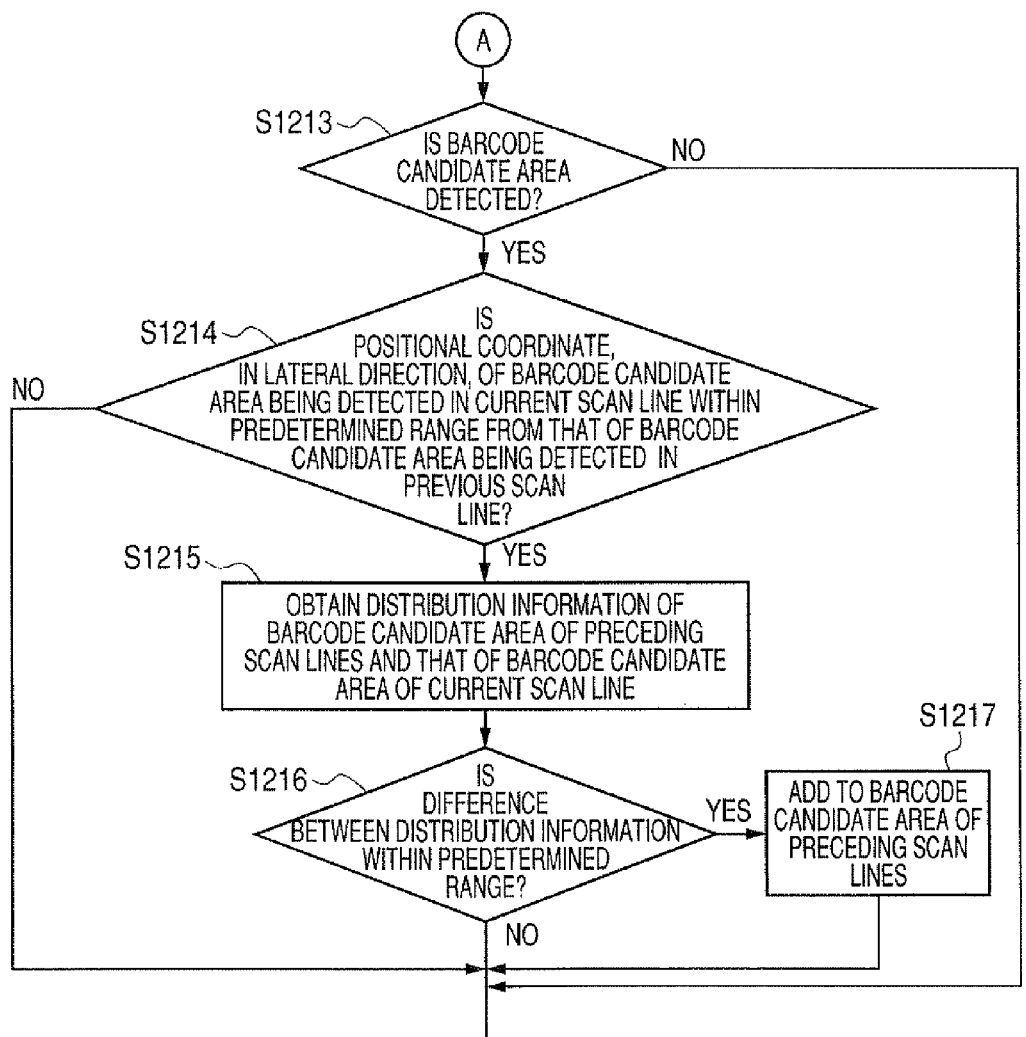

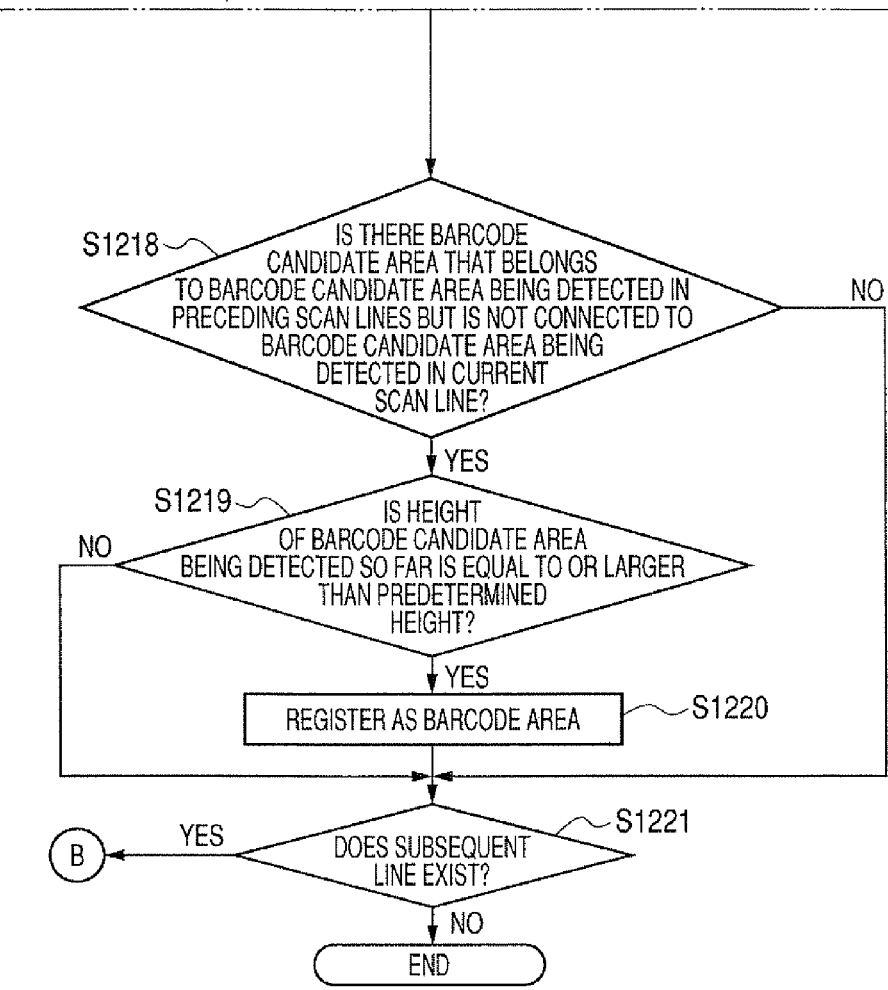

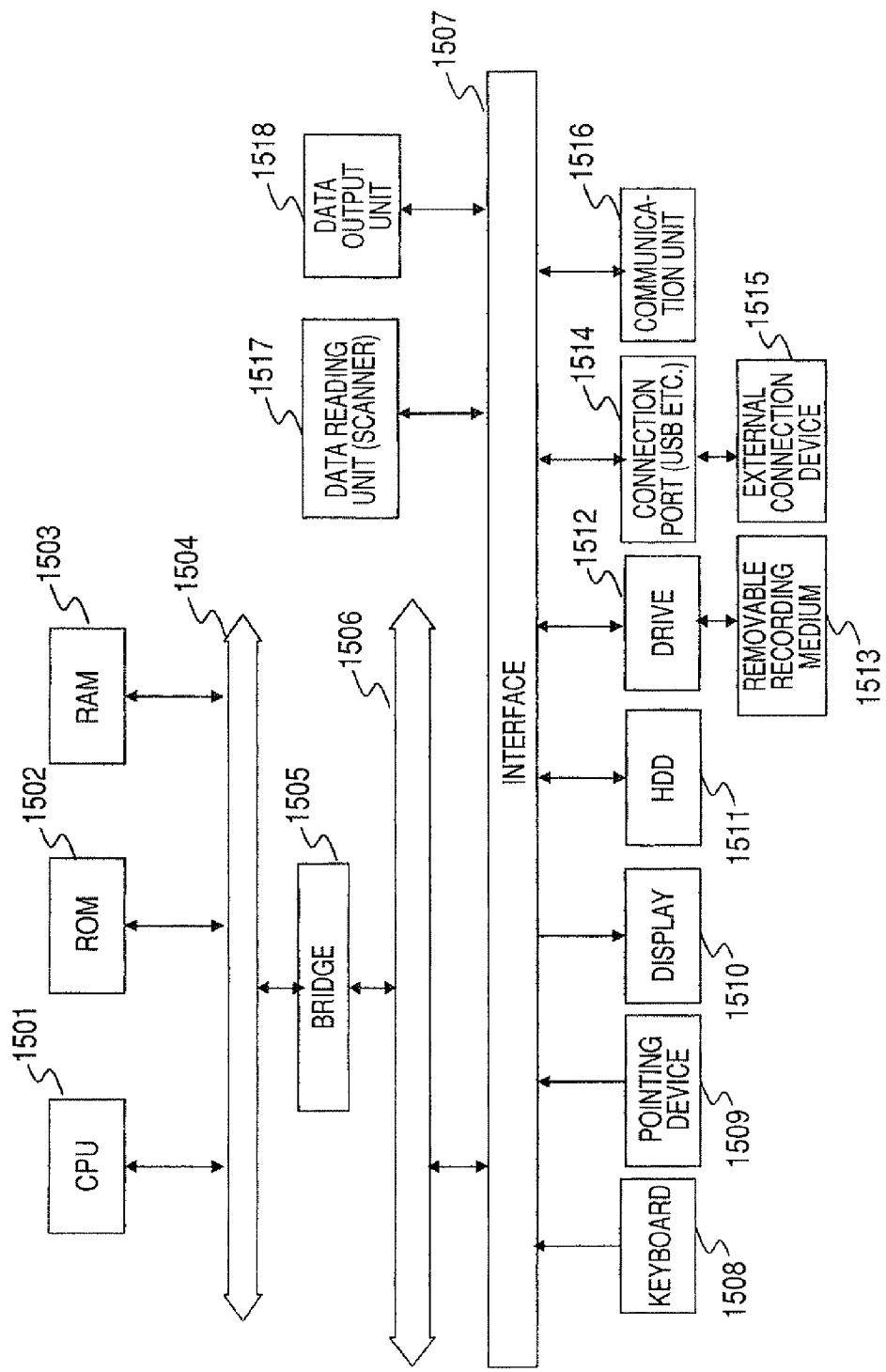

IMAGE PROCESSING APPARATUS, IMAGE PROCESSING METHOD AND COMPUTER-READABLE MEDIUM

CROSS-REFERENCE TO RELATED APPLICATIONS

This application is based on and claims priority under 35 U.S.C. §119 from Japanese Patent Application Nos. 2007-170350 (filed Jun. 28, 2007) and 2008-101471 (filed on Apr. 9, 2008).

BACKGROUND

1. Technical Field

The invention relates to an image processing apparatus, an image processing method and a computer-readable medium.

2. Related Art

Various information processing technologies have been developed which use a barcode that is one type of an information image. In particular, there is a technology that extracts a barcode image from an input image.

The barcode is a code that represents information using a combination of parallel vertical lines having different widths and spaces therebetween. The barcode is optically read by transverse scanning. Types of the barcode include JAN code, NW-7, ITF, CODE 39, CODE 128, postal customer code, EAN 128, and the like.

SUMMARY

According to an aspect of the invention, an image processing apparatus includes a first detecting unit and a second detecting unit. The first detecting unit detects a leading end portion of the information image that represents information using black image areas and white image areas, based on (i) a first criterion and (ii) a ratio of a width of a certain white image area in the information image to a width of a black image area, which is detected by scanning prior to the certain white image area, or a ratio of a width of a certain black image area in the information image to a width of a white image area, which is detected by scanning prior to the certain black image area. The second detecting unit takes one of the black image areas and white image areas as an image area of interest and detects a portion, other than the leading end portion, of the information image based on (i) a second criterion being different from the first criterion and (ii) at least one of ratios of a width of the image area of interest to widths of black image areas and white image areas, which are detected by scanning prior to the image area of interest.

BRIEF DESCRIPTION OF THE DRAWINGS

Exemplary embodiments of the invention will be described in detail below with reference to the accompanying drawings, wherein

FIG. 4 is an explanatory diagram showing examples of an information image that is a process target in the first exemplary embodiment of the invention;

FIG. 5 is an explanatory diagram showing an exemplary process of detecting a leading end portion of a barcode;

FIG. 13 is a flowchart showing the exemplary barcode extracting process according to the second exemplary embodiment of the invention;

FIG. 15 is a block diagram showing an exemplary hardware configuration of a computer that realizes the exemplary embodiment of the invention.

DETAILED DESCRIPTION

Hereinafter, various exemplary embodiments suitable for realizing the invention will be described with reference to the accompanying drawings.

Figure 1:
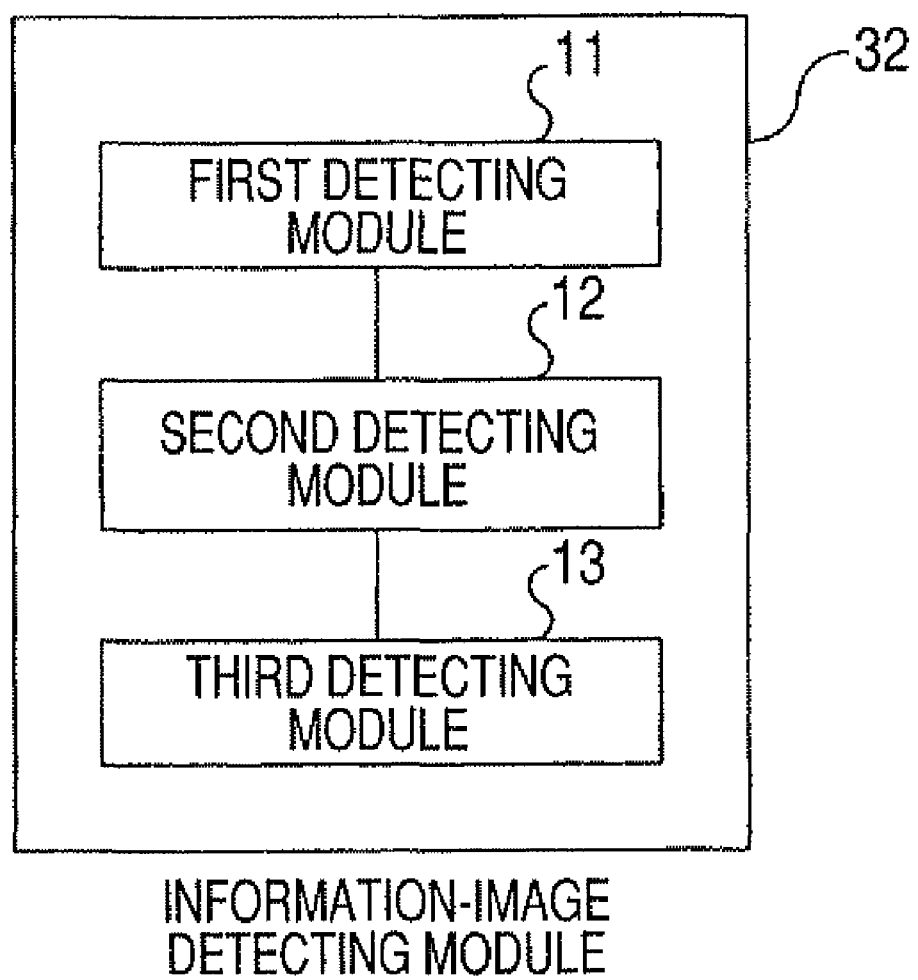
FIG. 1 is a conceptual diagram showing a module configuration according to a first exemplary embodiment of the invention.

FIG. 1 is a conceptual diagram showing a module configuration according to a first exemplary embodiment of the invention.

The term "module" generally represents a component such as software (computer program) or hardware that can be logically separated. Therefore, the modules in this exemplary embodiment refer to a module having a hardware configuration as well as a module in a computer program. For this reason, description on this exemplary embodiment will serve as description on a computer program, a system, and a method. Although "store," "cause something to store," or other equivalent terminologies are used for the sake of explanation, when this exemplary embodiment is embodied as a computer program, these terminologies refer to controlling a storage device to store the computer program. The modules generally correspond to functions in a one-to-one correspondence relation. In implementation, one module may be configured by one program. Alternatively, a plurality of modules may be configured by one program. Conversely, one module may be configured by a plurality of programs. Moreover, a plurality of modules may be executed by one computer, or one module may be executed by a plurality of computers in a distributed or parallel computing environment. One module may include another module. In the following descriptions, the term "connection" is used to include not only physical connection but also logical connection (such as transmission/reception of data, instruction, a referencing relationship between data).

The term "system," "apparatus" or "device" refer to one in which a plurality of computers, hardware, devices or the like are connected to each other via a communication unit such as a network (including communication connection in a one-toone correspondence), and one in which the system, apparatus or device is realized by one unit of a computer, hardware, an device, and the like. The term "predetermined" refers to "being determined in advance" and also refers to "in accordance with a condition/status at that time" or "in accordance with a preceding condition/status.

The term "information image" refers to a code that represents information using black image areas and white image areas and that is systematically created to represent electronic data in a machine-readable form. Specifically, examples of the "information image" include a one-dimensional barcode, a stacked two-dimensional code, and the like.

FIG. 4 shows examples of the information image, which are process targets in this exemplary embodiment. FIG. 4 shows, as a one-dimensional barcode, (A) CODE 39, (B) NW7, (C) CODE 93, (E) JAN, and (F) CODE 128. Although not shown in FIG. 4, EAN 128 is also an example of the one-dimensional barcode. FIG. 4 shows, as a stack-type two-dimensional code, (G) CODE 49, (H) CODE 16K, and (I) PDF 417. All the currently existing one-dimensional barcode are included in the process target of this exemplary embodiment. Also, such a two-dimensional code is included in the process target of this exemplary embodiment that it is formed by stacking the one-dimensional barcodes in plural stages. Therefore, a two-dimensional code such as QR code is not the process target of this exemplary embodiment. In this exemplary embodiment, an example in which the information image to be processed is a one-dimensional barcode will be described. The information image is configured to include bars that are black image areas and white bars that are white image areas (spaces).

An information-image detecting module 32 of the first exemplary embodiment is configured to extract an information image in an image by scanning the image. As shown in FIG. 1, the information-image detecting module 32 includes a first detecting module 11, a second detecting module 12, and a third detecting module 13.

The first detecting module 11 is connected to the second detecting module 12 and is configured to detect a start code of a barcode based on (i) a first criterion and (ii) a ratio of a width of a certain white bar in the barcode to a width of a black bar, which is scanned prior to the certain white bar. Particularly, the ratio used by the first detecting module 11 may be a ration of a width of a black bar that has been first found in the line to be scanned to a width of a next white bar (being adjacent to the first black bar). Alternatively, the first detecting module 11 may use a ratio of a width of a certain black bar in the barcode to a width of a white bar, which is scanned prior to the certain black bar, instead of the ratio of the width of the certain white bar in the barcode to the width of the black bar, which is scanned prior to the certain white bar.

The second detecting module 12 is connected to the first detecting module 11 and the third detecting module 13. The second detecting module 12 is configured to take one of the black bars and white bars as a bar of interest and detect a portion, other than the leading end portion, of the barcode based on (i) a second criterion being different from the first criterion and (ii) at least one of ratios of a width of the bar of interest to widths of black bars and white bars, which are scanned prior to the bar of interest. Here, the term "portion other than the leading end portion" refers to a decodable area that is in the barcode image and follows the leading end portion.

The third detecting module 13 is connected to the second detecting module 12 and is configured to detect the number of the black bars or the number of the white bars in the barcode having the portion, which is other than the leading end portion and which is detected by the second detecting module 12.

While the image is being scanned to detect the black bars and the white bars subsequently, the first and second detecting unit 11 and 12 may perform the detecting process. Also, if the first detecting unit 11 detects the leading end portion of the barcode during scanning of a certain line of the images the first detecting module 11 does not perform the detecting process, but the second detecting module 12 and the third detecting module 13 perform the detecting processes during the scanning after the first detecting unit 11 detects the leading end portion of the barcode.

Figure 2:
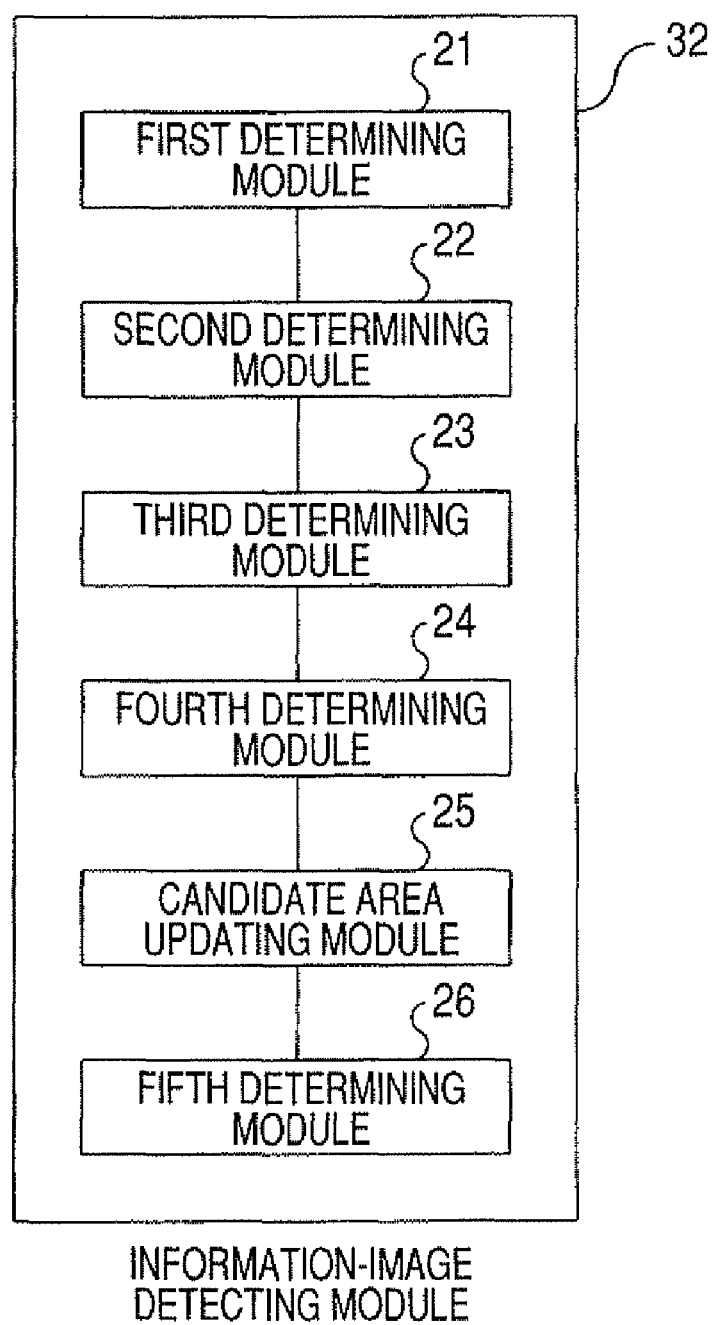
FIG. 2 is a conceptual diagram showing a module configuration according to another aspect of the first exemplary embodiment of the invention.

As shown in FIG. 2, the information-image detecting module 32 according to another aspect of the first exemplary embodiment includes a first determining module 21, a second determining module 22, a third determining module 23, a fourth determining module 24, a candidate-area updating module 25, and a fifth determining module 26.

The first determining module 21 is connected to the second determining module 22 and is configured to determine as to whether or not a width of a white bar of interest (i) is equal to or less than two times a width of a bar that has been detected just before the white bar of interest and (ii) is equal to or larger than a half of the width of the bar, which has been detected just before the white bar of interest. That is, the width of the first bar is compared with the width of the subsequent white bar (i.e., the first white bar). If this criterion is met, there is a possibility that the start code of the barcode is detected. If this criterion is not met, the first bar does not form a part of a barcode. The consecutive area of the bars and the white bars, which meets this criterion, is processed by the second determining module 22.

The second determining module 22 is connected to the first determining module 21 and the third determining module 23. The second determining unit 22 is configured to make a determination for the barcodes, which meets the criterion of the first determining module 21, as to whether or not a width of a bar of interest or a white bar of interest (i) is equal to or less than four times the minimum width of the bars or the white bars, which have been scanned before the bar of interest or the white bar of interest, and (ii) is equal to or larger than a quarter of the maximum width of the bars or the white bars, which have been scanned before the bar of interest or the white bar of interest. The consecutive area of the bars and the white bars, which meets this criterion, is processed by the third determining module 23.

The second determining module 22 may make the determination for each bar or each white bar. That is, the second determining module 22 may determine as to whether or not the width of the bar of interest (i) is equal to or less than four times the minimum width of the bars, which have been scanned before the bar of interest and (ii) is equal to or larger than a quarter of the maximum width of the bars, which have been scanned before the bar of interest. Alternatively, the second determining module 22 may determine as to whether or not the width of the white bar of interest (i) is equal to or less than four times the minimum width of the white bars, which have been scanned before the white bar of interest and (ii) is equal to or larger than a quarter of the maximum width of the white bars, which have been scanned before the white bar of interest. In some cases, the bars are printed with the being thickened uniformly. The above determination is suitable for such a printed matter.

The third determining module 23 is connected to the second determining module 22 and the fourth determining module 24. The third determining module 23 is configured to make a determination for the consecutive area of the bars and the white bars, which meets the criterion of the second determining module 22, as to whether or not the bar of interest causes the number of the bars, which have already appeared, to reach the minimal number of bars of the barcode. The consecutive area of the bars and the white bars in which the number of the bars having already appeared satisfies the minimal number-of-bar requirement of the barcode is processed by the fourth determining module 24.

The fourth determining module 24 is connected to the third determining module 23 and the candidate-area updating module 25. The fourth determining module 24 is configured to detect a stop code of the barcode in accordance with the number of bars detected by the third determining module 23 and based on (i) the width of the bar or the white bar in the barcode having the portion, other than the leading end portion, detected by the second determining module 22 and (ii) a criterion different from those of the first and second detecting modules 21 and 22. Specifically, the fourth determining module 24 determines as to whether or not the width of the white bar of interest is equal to or less than 1½ times the maximum width of the white bars, which have been scanned before the white bar of interest. The purpose of this is to determine as to whether or not the white bar of interest is a trailing end portion of the barcode.

The candidate-area updating module 25 is connected to the fourth determining module 24 and the fifth determining module 26 and is configured to add the bar of interest as a bar belonging to a candidate barcode area.

The fifth determining module 26 is connected to the candidate-area updating module 25 and is configured to determine as to whether the candidate barcode area continues plural lines.

Figure 3:
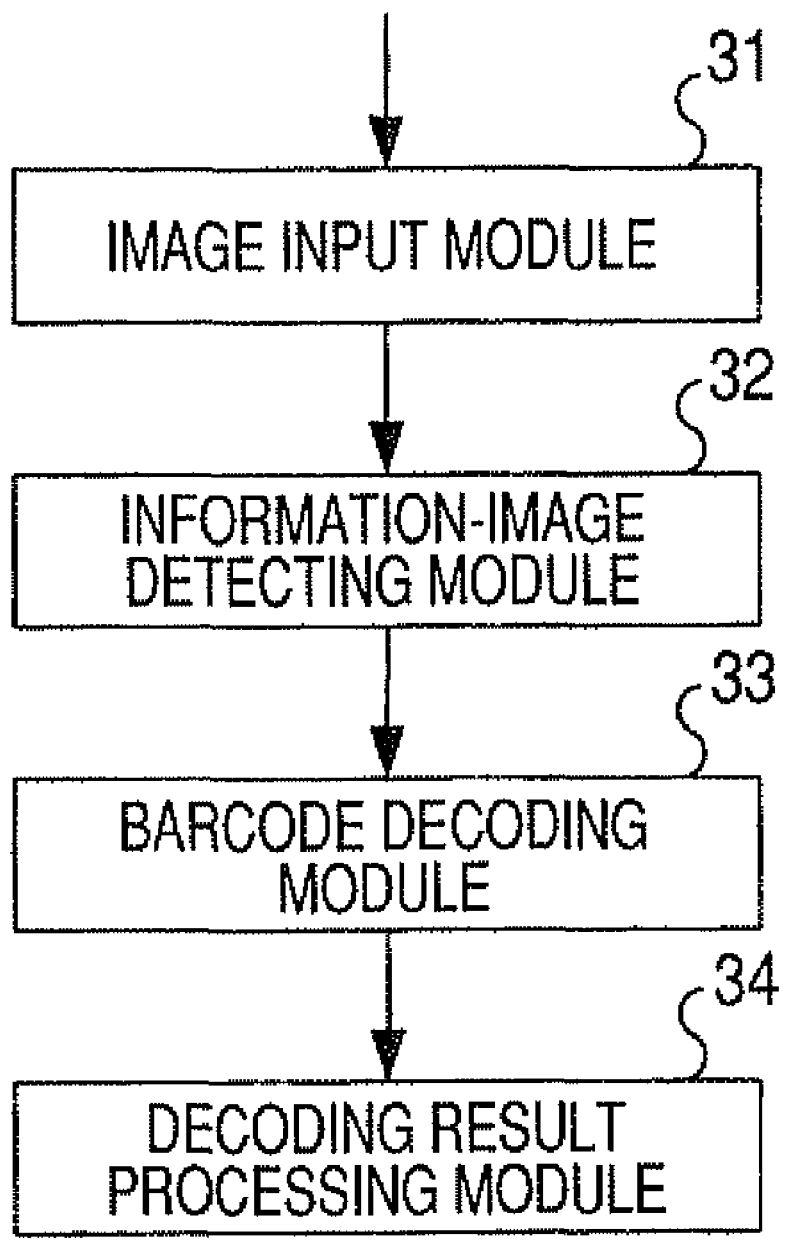
FIG. 3 is a diagram showing an overall module configuration of the first exemplary embodiment of the invention.

Next, an overall module configuration of the first exemplary embodiment will be described with reference to FIG. 3. The entirety of the first exemplary embodiment is configured to include an image input module 31, the information-image detecting module 32, a barcode decoding module 33, and a decoding result processing module 34.

The image input module 31 is connected to the information-image detecting module 32 and is configured to receive an input image that contains a barcode. The image input module 31 transmits the input image to the information-image detecting module 32. The input image may contain a plurality of barcodes, and the barcodes may be of a plurality of types and have an inclination with respect to a scanning direction.

The information-image detecting module 32 is connected to the image input module 31 and the barcode decoding module 33. The information-image detecting module 32 is configured to detect a barcode that is the information image, from the input image transmitted from the image input module 31. The information-image detecting module 32 transmits the detected barcode image to the barcode decoding module 33.

The barcode decoding module 33 is connected to the information-image detecting module 32 and the decoding result processing module 34. The barcode decoding module 33 is configured to extract information by analyzing the barcode image received from the information-image detecting module 32. That is, the barcode decoding module 33 serves as a decoder that decodes the barcode. The barcode decoding module 33 transmits the extracted information to the decoding result processing module 34.

The decoding result processing module 34 is connected to the barcode decoding module 33 and is configured to process the information received from the barcode decoding module 33. For example, the decoding result processing module 34 extracts an electronic document that is electronic information of an image, based on a document name represented by a barcode contained in the image.

Next, a specific concept of the first exemplary embodiment will be described with reference to FIG. 5.

First, one-dimensional barcodes are classified into one type having two widths (narrow and wide bars) and the other type having four widths. For this reason, if a bar appears which has a width (i) larger than four times the minimum width of bards that have been detected before or (ii) less than a quarter of the maximum width of the bars, which have been detected before, during bar detection, it can be determined that the barcode area is discontinued.

If an allowable width ratio is set to a range of ¼ to 4 when a bar in the leading end portion is detected, there is a possibility that an area other than the barcode area may be detected as the barcode area. Such a case will be described with reference to FIG. 5.

FIG. 5(A) shows the surroundings of a barcode in the image input by the image input module 31. The barcode is surrounded by a rule line 53. FIG. 5(B) is an enlarged view of a firstly detected portion 52 when the input image is scanned along the line 51 shown in FIG. 5(A).

In this case, the first scanning operation detects the rule line 53 prior to the bars 54 to 58 of the true barcode. However, since a width of a space between the rule line 53 and the starting bar 54 of the barcode is less than four times a width of the rule line 53, the rule line 53 is also detected as the barcode area.

Figure 6:
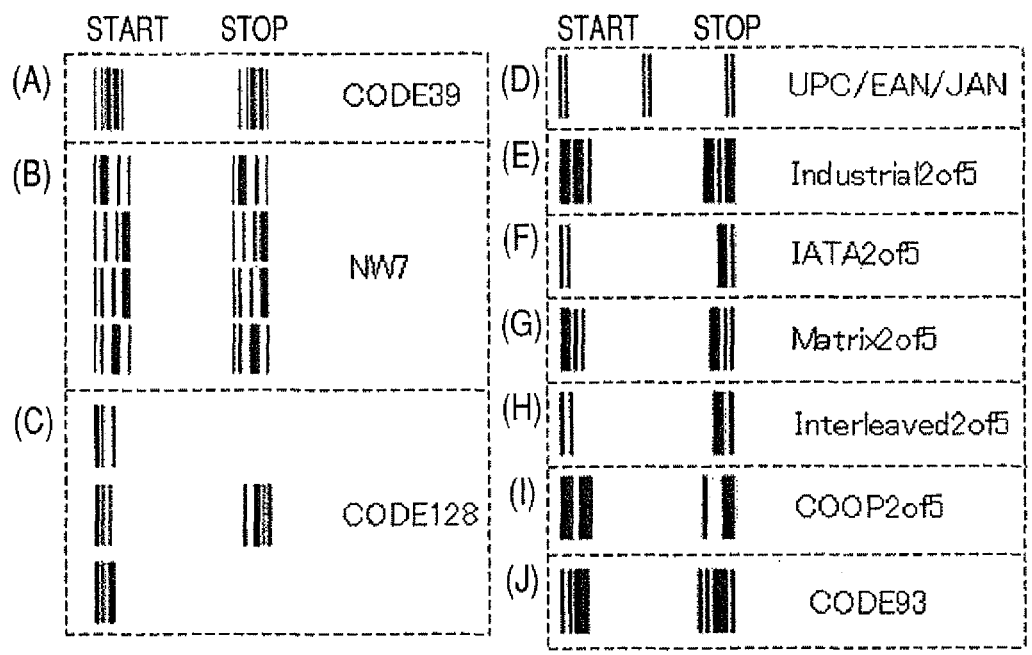
FIG. 6 is an explanatory diagram showing an example of a start code and a stop code of the barcode.

FIG. 6 shows a start code and a stop code of a general barcode. The start code is a specific code that indicates the start of the barcode. The stop code is a specific code that indicates the end of the barcode. These codes are also referred to as a start character and a stop character, respectively. For example, the JAN code uses other terminologies, that is, a left guard bar (a left end portion of the barcode), a right guard bar (a right end portion of the barcode), and a center bar (a portion of the barcode other than the left and right guard bars). The left guard bar and the right guard bar correspond to the start code and the stop code, respectively.

When these character configurations are studied, it can be found that a distance between the first bar and the second bar (that is, a width of the first white bar) is never larger than four times the width of the first bar and never less than a quarter of the width of the first bar. Therefore, the allowable width ratio should be decreased when detecting a bar following the first bar. In this exemplary embodiment, the allowable width ratio is set such that the width of the first white bar is (i) equal to or less than twice the width of the preceding bar and (ii) equal to or larger than a half of the width of the preceding bar. The example of FIG. 6(D) shows that the UPC, EAN or JAN code includes an intermediate code as well as the start code and the stop code.

If the number of bars detected meets the minimal number-of-bars requirements of a single barcode, it is highly likely that most types of the bars of different sizes (widths) have appeared at least once. If the detection operation is continued without adjusting the allowable width ratio that "a width of a bar of interest should be (i) equal to or less than four times the minimum width of bars that have been scanned before and (ii) equal to or larger than a quarter of the maximum width of the bars, which have been scanned before," it is likely that the bar detection operation is continued in an area outside the barcode when a quiet zone at the end of the barcode is small. The quiet zone is a blank (white) area before and after a barcode, which is essential to barcode detection and also known as a margin. In general, if other patterns such as the rule line 53 or the like are in the quiet zone, the barcode may not be recognizable. Such a case will be described with reference to FIG. 7.

Figure 7:
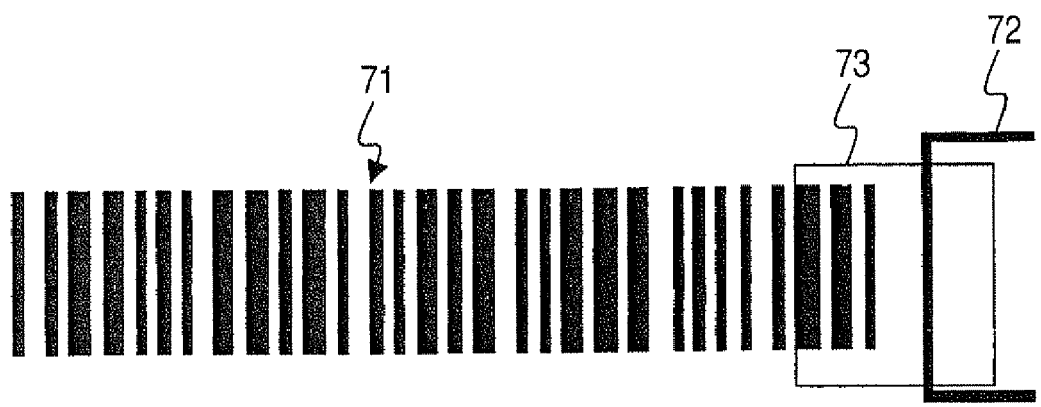
FIG. 7 is an explanatory diagram showing an exemplary process of detecting a trailing end portion of the barcode.

As shown in FIG. 7, when the bars in the last portion (a detection area 73) of the barcode 71 are being detected, a distance between the final bar of the barcode and a frame of the adjacent rule line 72 satisfies the relation that (i) being equal to or less than four times the minimum width of the bars, which have been scanned before and (ii) equal to or larger than a quarter of the maximum width of the bars, which have been scanned before". Therefore, the rule line 72 is erroneously detected as a bar of the barcode. For this reason, the allowable width ratio is decreased when the number of bars encountered satisfies the minimal number-of-bars requirements of a single barcode.

FIG. 6 shows typical examples of the start code and the stop code of the barcode. When these examples are studied, it can be found that when a start code for a barcode having two width types of codes appears, both a bar having a width 1 and a bar having a width 2 have always appeared.

On the other hand, when a start code for the CODE128 having four width types of codes appears, only bars of width 1 to 3 have appeared and there is a possibility that a bar of a width 4 may appear later. In this case, although the width ratio is calculated as 4/3 (=1.33), an allowable width ratio of 1.5 is used considering measurement errors.

Accordingly, if a space having a width greater than 1.5 times the maximum width of the bars, which have been scanned before, appears, it is determined that the scanning operation reaches the end of the barcode area.

In this way, the allowable width ratio is changed in accordance with the number of bars detected, and the detection is stopped when a bar does not satisfy the allowable width ratio. With such a process, it is possible to extract only the barcode while the quiet zone at the end of the barcode is detected as the quiet zone not as the bar of the barcode.

Some barcodes are configured such that a single character is composed of 6 to 9 bars and the start code and the stop code are always included therein. Therefore, each barcode has the minimal number-of-bars requirements.

For example, the minimal number of bars including the start code and the stop code is 29 for CODE 39, 23 for NW7, and 19 for CODE 128.

Therefore, it is determined as to whether or not the number of bars detected satisfies the minimal number-of-bar requirement of the barcode (i.e., in the case of CODE 128, whether or not the number of bars detected amounts to 19). If satisfied, the bars are registered as a candidate barcode area.

After the candidate barcode area has been detected by scanning one line, the scanning operation is performed for the subsequent line. If the candidate barcode area detected in the subsequent line overlaps with the candidate barcode area detected in the previous line, the two candidate barcode areas are combined with each other. Whether or not the areas overlap with each other is determined based on the X coordinates (coordinates in the scanning direction) of the areas. That is, if the X coordinates are the same, the areas are determined to overlap with each other.

If the candidate barcode areas obtained after repeated scanning operations occupy more than a predetermined number of successive lines, the areas are combined with each other to be determined as the barcode area.

Next, a flow of an exemplary process that is performed by the information-image detecting module 32 of the first exemplary embodiment will be described with reference to a flowchart shown in FIG. 8.

First, in step S201, the image input module 31 receives the image, which is input and binarized, and scans the image line by line. Thereafter, after one bar is detected, a width of the next bar is sequentially judged to determine as to whether or not the detected bars meet the minimal number-of-bar requirement of the barcode.

In step S202, the bar detection is started.

In step S203, it is determined as to whether or not the first bar of a barcode area is detected.

If it is the first bar (Yes in step S203), the flow proceeds to step S205. Otherwise (No in step S203), the flow proceeds to step S204.

In step S205, the scan operation proceeds to a white bar following the current black bar. Then, it is determined as to whether or not a width of the white bar is (i) equal to or less than twice a width of the preceding bar and (ii) equal to or larger than a half of the width of the preceding bar. This process corresponds to the first determining module 21 shown in the example of FIG. 2. If the width of the white bar is out of this range (No in step S205), the flow proceeds to step S212 because the current bar does not belong to the barcode area. If the width of the white bar is within this range (Yes in step S205), the flow proceeds to step S208 to add the bar of interest and the white bar to a candidate barcode area, and then proceeds to step S209. That is, if a start code of the barcode is detected, it is attempted to extract a next bar in the same line without performing the processes in steps S204, S206 and S207 (step S209). In this case, in scanning after the start code is detected in the line of interest, the process in step S205 is not performed but the processes in steps S204 and S206 are performed, and a process in step S207 is performed depending on circumstances.

If it is determined in step S203 that the detected bar is not the first bar of the barcode area, the flow proceeds to step S204, and it is determined in step S204 as to whether or not a width of the bar of interest is (i) equal to or less than four times the minimum width of bars that have been scanned before and (ii) equal to or larger than a quarter of the maximum width of the bars, which have been detected before. This process corresponds to the second determining module 22 shown in the example of FIG. 2. If No in S204, the flow proceeds to step S210 because the scanning operation reaches the end of the barcode area. If Yes in S204, the flow proceeds to step S206. The determination in step S204 may be made based on the width of the white bar.

In step S206, it is determined as to whether the number of bars in the area detected so far satisfies the minimal number-of-bar requirement of a barcode. This process corresponds to the third determining module 23 shown in the example of FIG. 2. If satisfied (Yes in step S206), the flow proceeds to step S207. If not satisfied (No in step S206), the flow proceeds to step S208.

In step S207, it is determined as to whether or not a width of a white bar is equal to or less than 1.5 times the maximum width of the white bars that have been scanned before. This process corresponds to the fourth determining module 24 shown in the example of FIG. 2. If Yes in step S207, the flow proceeds to step S208 because the barcode area continues. In step S208, the current bar is registered as a bar forming the candidate barcode area. If No in step S207, the flow proceeds to step S210 because the scanning operation reaches the end of the barcode area.

In step S208, the current bar is registered as the bar forming the candidate barcode area. Then, the flow proceeds to step S209.

In step S209, it is checked as to whether or not a next bar exists on the scanning line. If exist (Yes in step S209), the flow returns to step S202 to detect the next bar. If not exist (No in step S210), the flow proceeds to step S210.

The flow reaches step S210 when the continuous barcode area comes to its end. In step S210, it is determined as to whether or not the number of bars contained in the candidate area detected so far satisfies the minimal number-of-bar requirement of the barcode. If satisfied (Yes in step S210), the flow proceeds to step S211. If not satisfied (No in step S210), the candidate area is discarded and the flow proceeds to step S212.

In step S210, in addition to the above determination criterion relating to the number of bars, it may be further determined as to whether or not thicknesses of the bars or the white bards are two types or four types. That is, if the number of bars contained in the candidate area detected so far satisfies the minimal number-of-bar requirement of the barcode (Yes) and if the thicknesses of the bars or the white bars are two types or four types, the flow proceeds to step S211. Otherwise, the flow proceeds to step S212. To make this determination, a grouping process is performed for the thicknesses of the black bars or the white barks. This grouping process determines that bars (white bars), which have thicknesses within a predetermined range from a certain reference thickness, belong to one group and forms a group. Then, the number of groups corresponds to the number of types of thicknesses.

In step S211, an area that has been detected as a bar of a barcode so far is set to the candidate barcode area.

In step S212, detection of a subsequent bar is performed. If exists (Yes in step S212), the flow returns to step S202 and repeats the above-described steps. If not exists (No in step S212), the flow proceeds to step S213.

In step S213, it is determined as to whether or not there is a subsequent scanning line. If exists (Yes in step S213), the flow returns to step S201. If not exists (No in step S213), the flow proceeds to step S214.

In step S214, it is determined as to whether or not the candidate barcode area detected in each of the scanning lines occupies predetermined plural scanning lines. This process corresponds to the fifth determining module 26 shown in the example of FIG. 2. If the candidate barcode area occupies the predetermined plurality of scanning lines (Yes in step S214), the flow proceeds to step S215. Otherwise (No in step S214), the flow proceeds to step S216.

In step S215, the candidate area is output as a barcode area to a decoder. The barcode area output in this step is not necessarily all of the individual barcodes illustrated in FIG. 4, but only needs to be a barcode-decodable area. For example, in the case of JAN code shown in FIG. 4(E), the lengths of the bars are not constant; some bars are longer than other bars. In such a code system, a part of the bars including the bars longer than the other bars are not necessarily used as the barcode area, but only need to use an area having the same length as the other bars as the barcode area to be output to the decoder.

In step S216, it is determined that there is no barcode area because the candidate barcode area does not occupy the predetermined plural scanning lines.

To cope with the case in which a plurality of barcodes exist on one scanning line, ID numbers may be assigned to the candidate barcode areas detected so as to identify each barcode area using its X coordinate.

Next, an exemplary image to be processed in the first exemplary embodiment will be described with reference to FIGS. 9 and 10.

Figure 9:
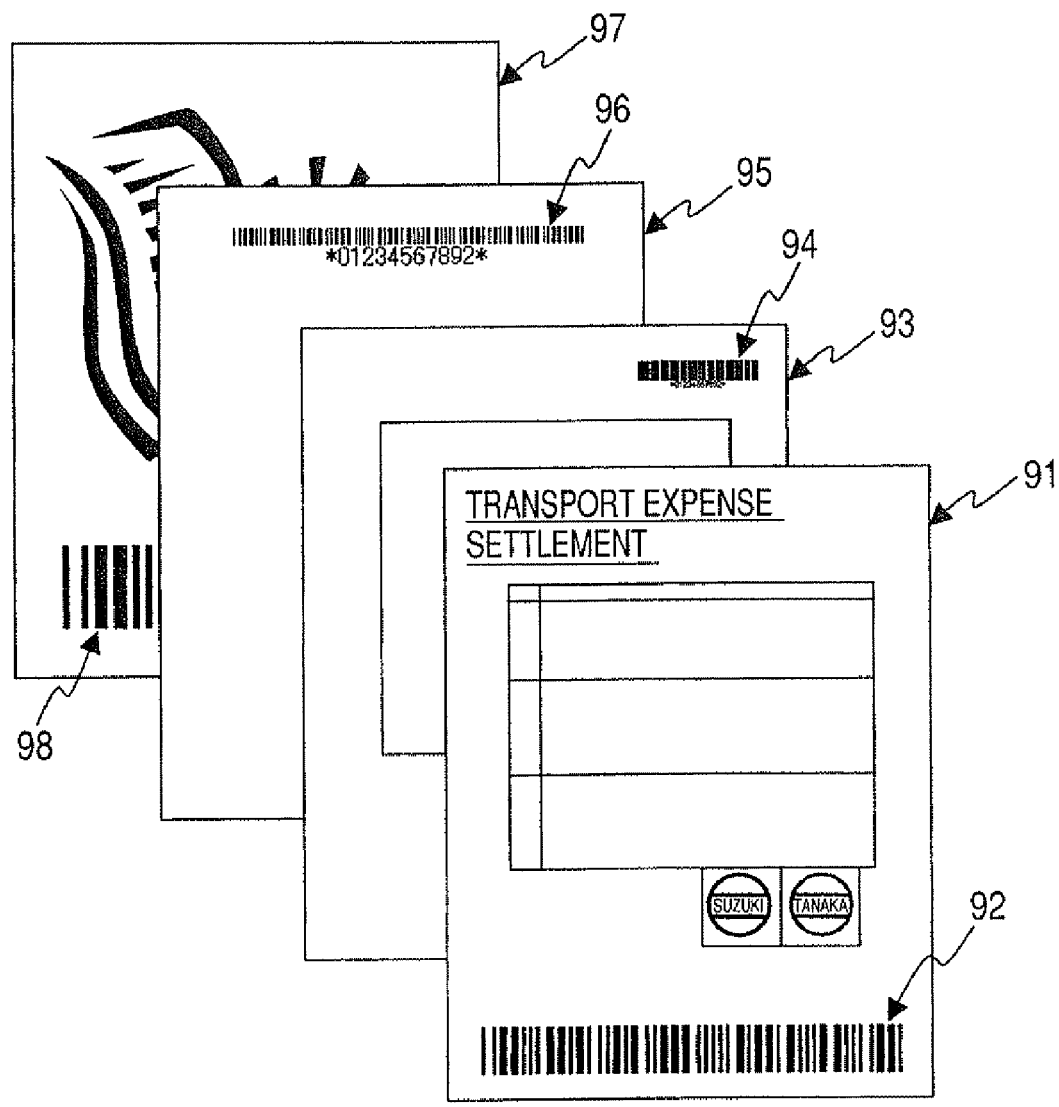
FIG. 9 is an explanatory diagram showing an exemplary image that contains the barcode, which is the process target in the first exemplary embodiment of the invention.

In the example of FIG. 9, images of a plurality of form sheets 91, 93, 95, and 97 that respectively contain barcodes 92, 94, 96, and 98 are sequentially input to the image input module 31 using an automatic document feeding device or the like. The respective barcodes are of different types. The input images are process targets of the first exemplary embodiment.

Figure 10:
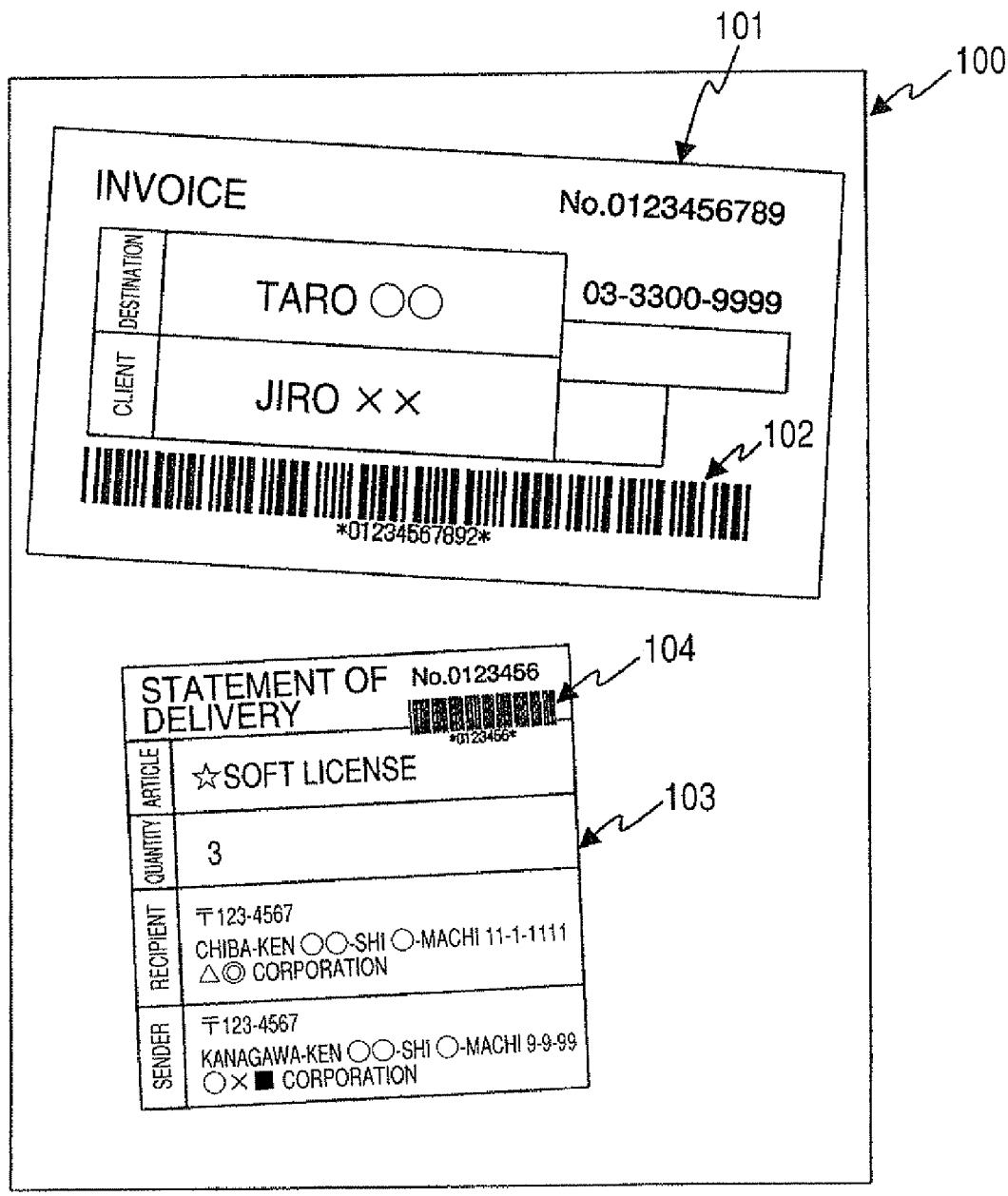
FIG. 10 is an explanatory diagram showing another exemplary image that contains the barcode, which is the process target in the first exemplary embodiment of the invention.

FIG. 10 shows an example in which an image 100 including two form sheets (an invoice 101 and a statement of delivery 103) that respectively contain barcodes 102 and 104 is input to the image input module 31. The barcode in each of the form sheets is in vicinity of or in contact with a rule line or the like. The barcodes are of different types and are inclined with respect to a scanning direction. This exemplary embodiment can process such an image without dividing a barcode area into separate areas. Also, even if an extraction area is in contact with another object, this exemplary embodiment can process an image without changing a shape of an extracted barcode. In order for this to work, the candidate barcode areas obtained in each of the scanning lines should overlap with each other and should occupy more than the predetermined number of lines, so that it is determined Yes in step S215 of the flowchart shown in FIG. 8.

Next, a second exemplary embodiment will be described.

In the first exemplary embodiment, the processes are performed line by line. In the second exemplary embodiment, processes are performed every predetermined lines. Also, in order to keep accuracy of barcode extraction while omitting some process, a process performed by a fifth determining module 116 is added.

Figure 11:
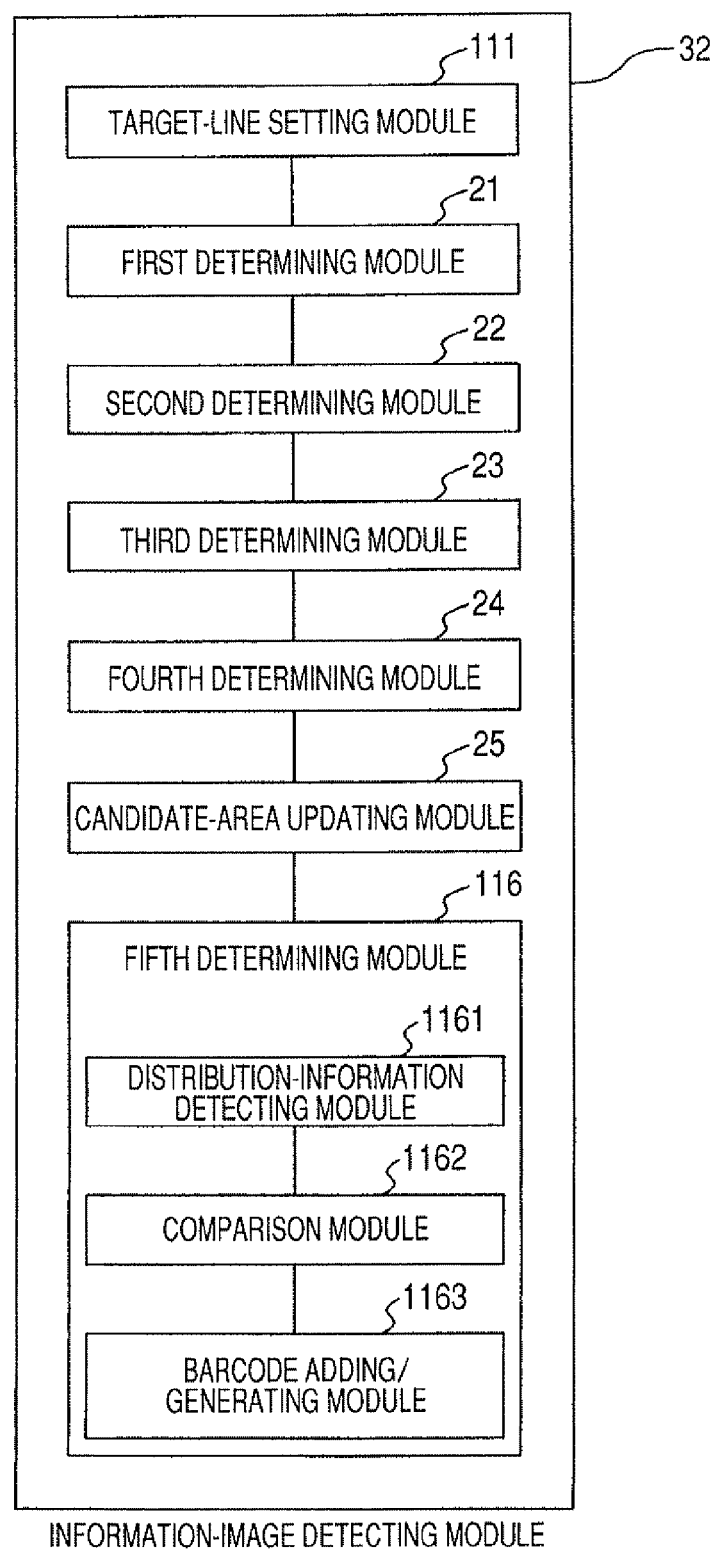
FIG. 11 is a conceptual diagram showing a module configuration according to a second exemplary embodiment of the invention.

FIG. 11 shows a conceptual diagram showing an exemplary module configuration of an information-image detecting module 32 of the second exemplary embodiment. It is noted that similar reference signs are given to similar modules to those of the first exemplary embodiment, and duplicate description thereon will be omitted. Also, an overall module configuration of the second exemplary embodiment is similar to that of the first exemplary embodiment, that is, to that shown in FIG. 3.

As shown in FIG. 11, the information-image detecting module 32 includes, a target-line setting module 111, a first determining module 21, a second determining module 22, a third determining module 23, a fourth determining module 24, a candidate-area updating module 25 and the fifth determining module 116. Also, the fifth determining module 116 includes a distribution-information detecting module 1161 a comparison module 1162 and a barcode adding/generating module 1163.

The target-line setting module 111 is connected to the first determining module 21 and sets a line to be scanned (scan target line) in an image of interest (target image). Then, the target-line setting module 111 transmits the set line to the first determining module 21. For example, the target-line setting module 11 may set the scan target line every ten lines.

The first determined module 21 is connected to the target-line setting module 111 and the second determining module 22, and performs the process, which is similar to that being performed in the first exemplary embodiment, for the line which is set by the target-line setting module 111.

The distribution-information detecting module 1161 is connected to the comparison module 1162. After the fourth determining module 24 detects a stop code, the distribution-information detecting module 1161 detects information (hereinafter may be referred to as "distribution information) relating to a distribution of bars or white bars from a start code detected by the first determining module 21 to the stop code detected by the fourth determining module 24. For example, the distribution information may include any of thicknesses of the bars or the white bars, the number of the bars or the white bars, or statistical information (such as average or variance) of the bars or the white bars. In a barcode, thicknesses of bars or white bars or the number of bars or white bars are (is) constant, and therefore the distribution information thereof is constant. However, in a character area other than a barcode, distribution information thereof is not constant. Particularly, if a detection operation is performed every predetermined lines, distribution information of the respective lines are different because the lines are not adjacent to each other. With this method, barcodes and character areas are distinguished.

The comparison module 1162 is connected to the distribution-information detecting module 1161 and the barcode adding/generating module 1163. The comparison module 1162 compares the distribution information detected by the distribution-information detecting module 1161 with distribution information of a line that has already been scanned. For example, the comparison module 1162 calculates differences in thickness of bars or white bars and in number of bars or white bars, and outputs the differences as comparison results.

The barcode adding/generating module 1163 is connected to the comparison module 1162. The barcode adding/generating module 1163 adds a barcode (a barcode of a single line; which may be referred to as a "latter barcode") of a line being currently scanned (current scan target line) to a barcode (a barcode of a single line or plural lines; which may be referred to as "former barcodes") of lines, which have already been scanned, based on the distribution information detected by the distribution-information detecting module 1161, to generate a barcode. The process of the barcode adding/generating module 1163 is performed repeatedly. Therefore, the generated barcode becomes the barcode of the lines which have already been scanned. In this manner, the barcode is generated gradually, that is, extracted gradually. If bars are arranged in a longitudinal direction, the candidate-area updating module 25 generates a barcode in a lateral direction by adding a target bar as a bar of the barcode candidate area. The barcode adding/generating module 1163 generates a barcode in the longitudinal direction. Also, the barcode adding/generating module 1163 may generate a barcode based on the comparison results of the comparison module 1162. That is, if the comparison module 1162 determines that the distribution information detected by the distribution-information detecting module 1161 matches the distribution information of the barcode of the lines which have already been scanned, the barcode adding/generating module 1163 may generate a barcode. The expression "distribution information of both matches each other" includes not only the case where the both distribution information are exactly identical to each other but also the case where one distribution information is within a predetermined range from the other. For example, the expression "distribution information of both matches each other" includes the case where a difference which is the comparison result of the comparison module 1162 is equal to or less than a predetermined threshold value.

Before generating a barcode, the barcode adding/generating module 1163 may further causes the distribution-information detecting module 1161 (and the comparison module 1162 depending on circumstances) to detect distribution information of an intermediate line that is located between the former barcode and the latter barcode, to obtain its comparison result (results of comparing between the distribution information of former/latter barcodes and the distribution information of the intermediate line or a result of comparing between the distribution information of the latter barcode and the distribution information of the intermediate line). Then, the barcode adding/generating module 1163 may generate a barcode using such a comparison result. Also, this further process may be performed if the comparison result is equal to or less than another predetermined threshold value (second threshold value) which is different from the predetermined threshold value (first threshold value). For example, the second threshold value is less than the first threshold value and is close to the first threshold value. Also, the intermediate line may be a line that bisects a part between the former and latter barcodes or be selected randomly so long as it is located between the former and latter barcodes. Furthermore, the intermediate line is not limited to one but may be plural.

Figure 12:
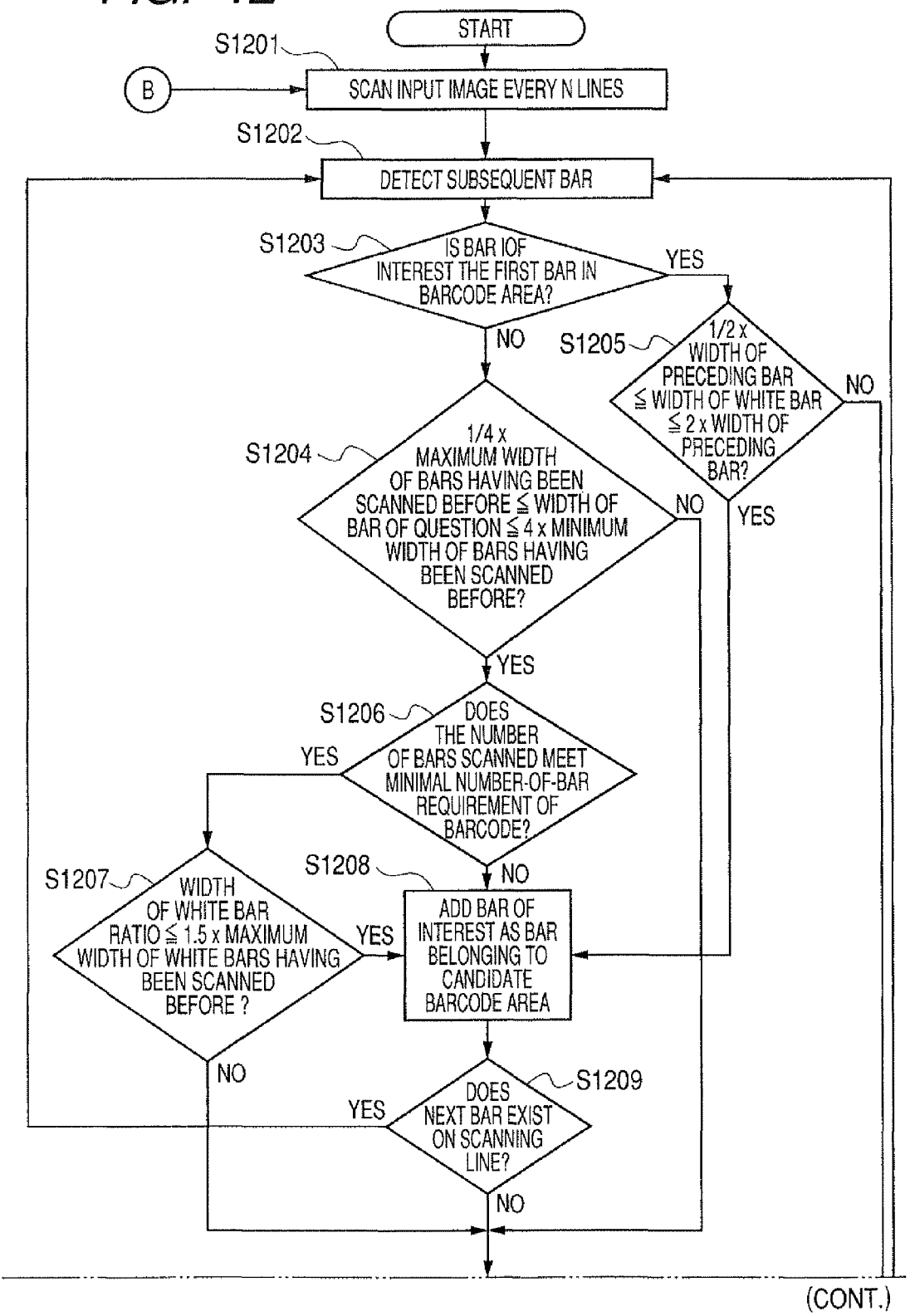
FIG. 12 is a flowchart showing an exemplary barcode extracting process according to the second exemplary embodiment of the invention.

Next, a flow of an exemplary process that is performed by the information-image detecting module 32 of the second exemplary embodiment will be described with reference to flowcharts shown in FIGS. 12 and 13 and exemplary processes shown in FIG. 14.

Figure 8:
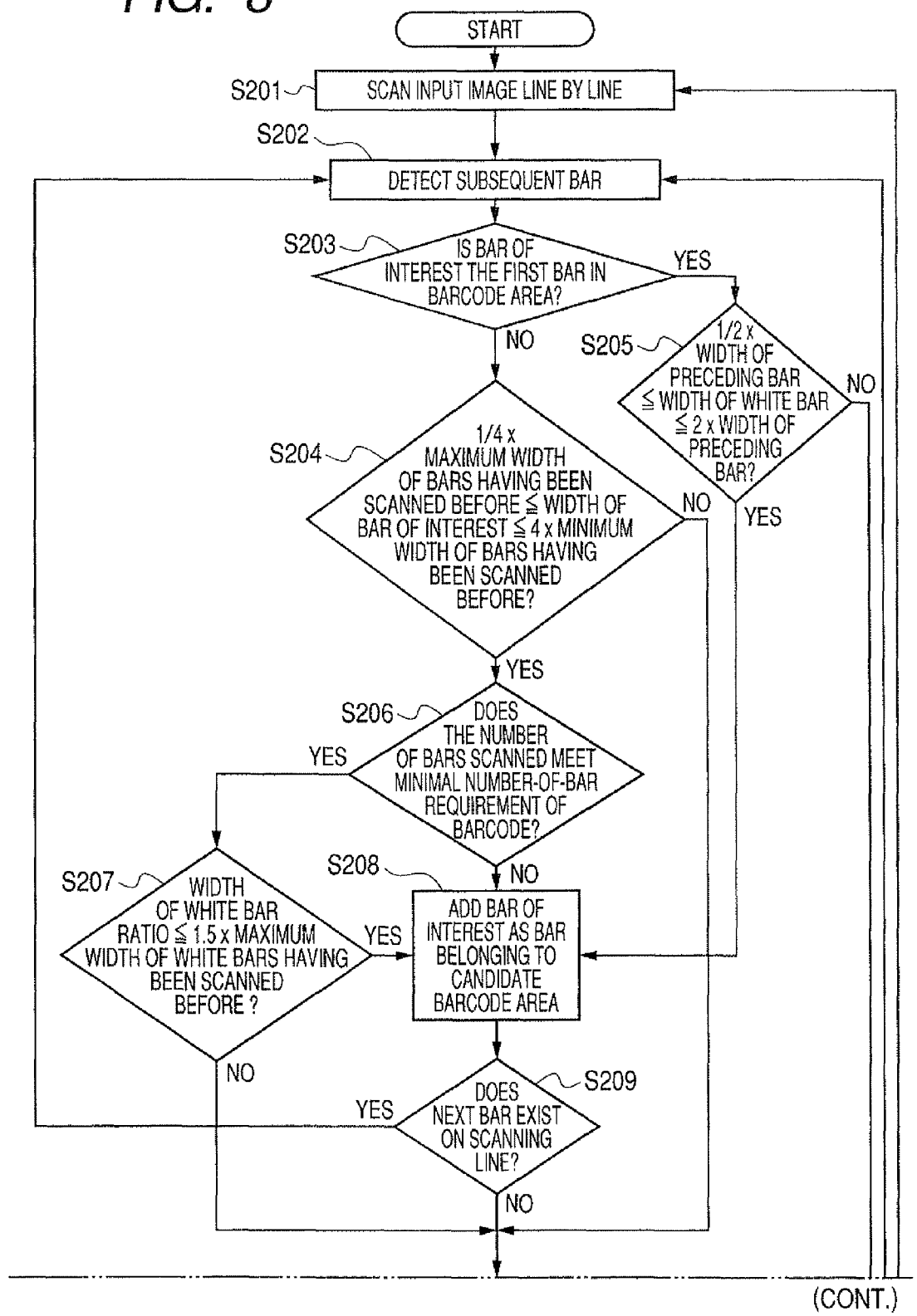
FIG. 8 is a flowchart showing an exemplary barcode extracting process according to the first exemplary embodiment of the invention.

Processes from steps S1202 to S1212 correspond to the processes from S202 to S212 of the flowchart of the first exemplary embodiment shown in FIG. 8, and thus description thereon will be omitted.

First, in step S1201, the image input module 31 receives the image, which is input and binarized, and scans the line which is set by the target-line setting module 111.

The processes from the steps S1202 to S1212 generate a barcode candidate area in the scan target line. That is, after one bar is detected, a thickness of a next bar is determined and it is determined in sequence as to whether or not the bar of interest constitutes a barcode.

Figure 14:
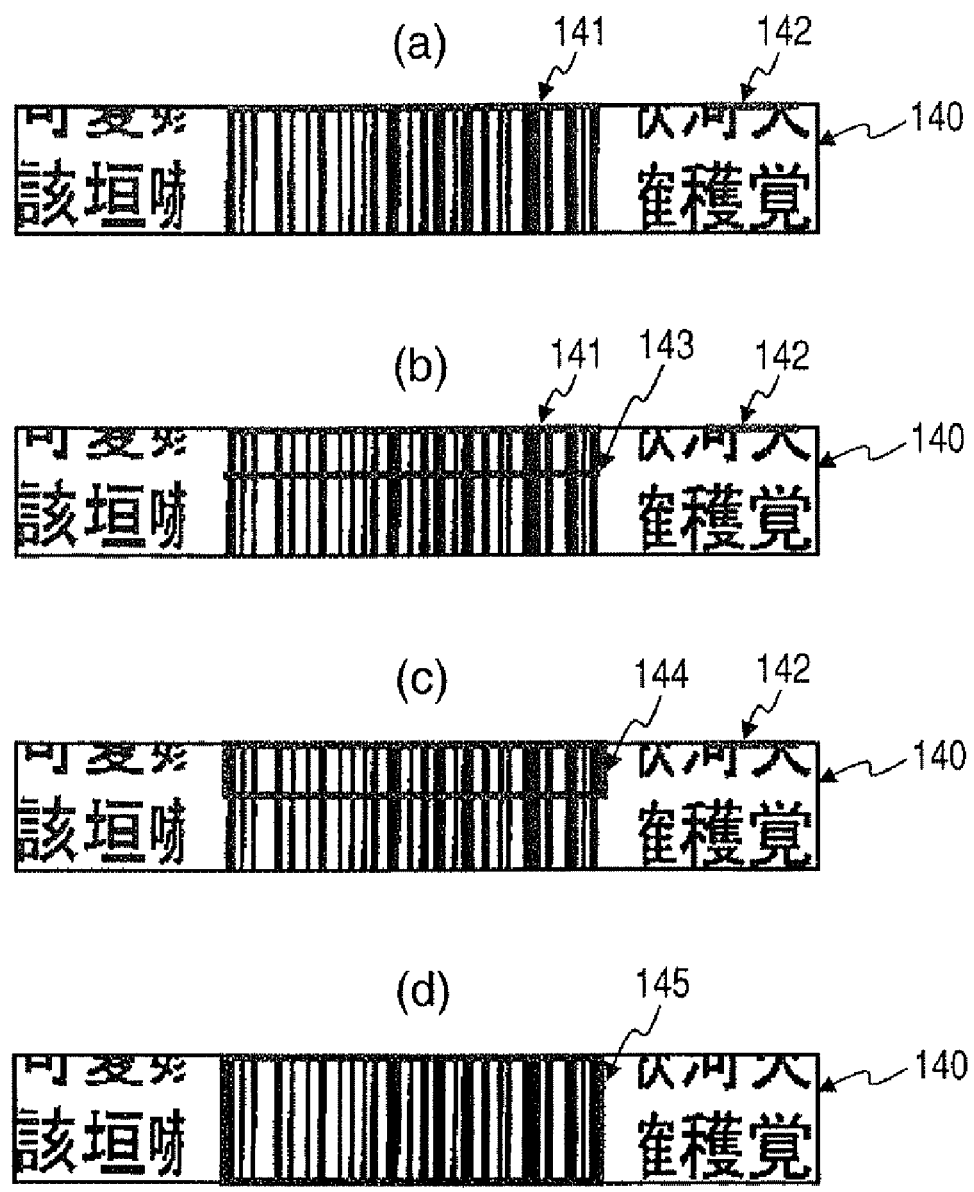
FIG. 14 is an explanatory diagram showing an exemplary process according to the second exemplary embodiment.

For example, as shown in FIG. 14(*a*), in a line of the first row of a target image 140, barcode candidate areas 141 and 142 are extracted. The barcode candidate area 141 is a barcode, but the barcode candidate area 142 is a character area. In the next process, that is, in the processes from the step S1202 to S1212 after the second step S1201 sets (1+N)th line to the scan target line, a barcode candidate area 143 is newly extracted as shown in an example of FIG. 14(*b*).

In step S1213, it is determined as to whether or not a barcode candidate area is detected, based on a result of scanning a single line, that is, based on a result of the processes from the steps S1201 to S1212 for the line of interest. If it is determined that the barcode candidate area is detected (Yes in step S1213), the flow proceeds to step S1214. Otherwise (No in step S1213), the flow proceeds to step S1218.

In step S1214, it is determined as to whether or not a positional coordinate of the barcode candidate area, which is detected in the current scan line, in the lateral direction (scan line direction) is within a predetermined range from that of the barcode candidate area, which is detected in the previous scan line. If it is determined that the positional coordinate of the barcode candidate area, which is detected in the current scan line, is within the predetermined range (Yes in step S1214), the flow proceeds to S1215. Otherwise (No in step S1214), the flow proceeds to step S1218. That is, step S1214 determines as to whether or not the two barcode candidate areas constitute one barcode, based on the positions of them. For example, the positional coordinate, in the lateral direction, of the barcode candidate area 143 shown in the example of FIG. 14(*b*) is within the predetermined range from that of the barcode candidate area 141. Therefore, the flow proceeds to step S1215. It is noted that the barcode candidate area 143 is not within the predetermined range from the barcode candidate area 142. Also, the "optional coordinate in the lateral direction" refers to coordinates of a barcode in right and left ends thereof, and may refer to a coordinate of a barcode only in a right end thereof or only in a left end thereof.

In step S1215, obtained are the distribution information of the barcode candidate area of the preceding scan lines and that of the barcode candidate area of the current scan line. The distribution-information detecting module 1161 may detect the distribution of the both. Also, with regard to the distribution information of the barcode candidate area of the preceding scan lines, the distribution information which have already been detected by the distribution-information detecting module 1161 may be used.

In step S1216, it is determined as to whether or not the distribution information of the both are within a predetermined range. If it is determined that the distribution information of the both are within a predetermined range (Yes in step S1216), the flow proceeds to step S1217. Otherwise (No in step S1216), the flow proceeds to step S1218. That is, step S1216 determines based on the distribution information as to whether or not the two barcode candidate areas constitute one barcode. For example, the distribution information of the barcode candidate area 143 shown in the example of FIG. 14(*b*) is in the predetermined range from that of the barcode candidate area 141. Therefore, the flow proceeds to step S1217.

In step S1217, the barcode candidate area of the current scan line is added to the barcode candidate area of the preceding scan lines. That is, the barcode candidate area of the preceding scan lines is extended to the barcode candidate area of the current scan line, to thereby generate a rectangle barcode. For example, as shown in the example of FIG. 14(*c*), the barcode candidate area 141 is extended to the barcode candidate area 143 to thereby generate a barcode candidate area 144.

In step S1218, it is determined as to whether or not there is a barcode candidate area that belongs to the barcode candidate area being detected in the preceding scan lines but is not connected to the barcode candidate area being detected in the current scan line. If it is determined that there is such a barcode candidate area (Yet in step S1218), the flow proceeds to step S1219. Otherwise (No in step S1218), the flow proceeds to S1221. That is, it is determined as to whether or not the flow is in the middle of barcode detection.

In step S1219, it is determined as to whether or not a height of the barcode candidate area being detected so far is equal to or larger than a predetermined height. If it is determined the height is equal to or larger than the predetermined height (Yes in step S1219), the flow proceeds to S1220. Otherwise (No in step S1219), the flow proceeds to S1221. That is, when there is a barcode candidate area based on which it can be determined that the previous scan line is the end of a barcode region, the flow reaches step S1219. In step S21219, it is determined as to whether or not the barcode candidate area has a height that is required to constitute a barcode to thereby determine as to whether or not detection of a barcode is completed. Since the barcode candidate area 142 shown in the example does not have the predetermined height, the flow proceeds to step S1221 and a process in step S1220 is not performed. Therefore, the barcode candidate area 142 is not registered as a barcode area.

In step S1220, the barcode candidate area of interest is registered as a barcode area. That is, the barcode candidate area of interest is detected as a barcode.

In step S1221, it is determined as to whether or not a next scan line exists. If exist (Yes in step S1221), the flow returns to step S1201, and the processes are repeated for the next target line. If no next scan line exists, the flow is completed, and the barcode candidate area(s), which is registered in step S1220 so far, is (are) the barcode area(s) in the image.

Next, an exemplary hardware configuration in accordance with the exemplary embodiments of the invention will be described with reference to FIG. 15. The hardware configuration shown in FIG. 11 is configured, for example, by a personal computer (PC) or the like and is provided with a data reading unit 1517 such as a scanner and a data output unit 1518 such as a printer.

A CPU (central processing unit) 1501 is a control unit that executes processes in accordance with a computer program having described therein the execution sequences of various modules described in the exemplary embodiments, such as the first detecting module 11, the second detecting module 12, the third detecting module 13, and the like.

A ROM (read only memory) 1502 stores programs, calculation parameters, or the like that the CPU 1501 uses. A RAM (random access memory) 1503 stores programs used in an execution performed by the CPU 1501 or parameters that appropriately change in the execution. The CPU 1501, the ROM 1502, and the RAM 1503 are connected to each other by a host bus 1504 that is configured as a CPU bus or the like.

The host bus 1504 is connected to an external bus 1506 such as a PCI (peripheral component interconnect/interface) bus through a bridge 1505.

A pointing device 1509 such as a keyboard 1508 or a mouse is an input device that is operated by a user. A display 1510 is formed of a liquid-crystal display apparatus, a CRT (cathode ray tube), or the like, and displays various pieces of information as text or images.

An HDD (hard disc drive) 1511 drives a hard disc installed therein to record or reproduce programs that are executed by the CPU 1501 and information into or from the hard disc. The hard disc stores an input image or the barcode image that is detected by the information-image detecting module 32. In addition, various computer programs such as data processing programs are stored in the hard disc.

A drive 1512 reads data or a program recorded in a recoding medium 1513 loaded therein, such as a magnetic disc, an optical disc, a magneto-optical disc, or a semiconductor memory, and sends the data or program to the RAM 1503 connected thereto through an interface 1507, the external bus 1506, the bridge 1505, and the host bus 1504. The removable recording medium 1513 can be used as the same data recording area as the hard disc.

A connection port 1514 is a port for connection to an external connection device 1515 and has a connection portion such as USB or IEEE 1394. The connection port 1514 executes a data communication process for communication with the external devices or apparatuses by being connected to the CPU 1501 or the like via the interface 1507, the external bus 1506, the bridge 1505, and the host bus 1504. The data reading unit 1517 is a scanner, for example, and executes a document reading process. The data output unit 1518 is a printer, for example, and executes a document data output process.

The hardware configuration shown in FIG. 15 is only one example of possible configurations of the invention. The exemplary embodiments of the invention are not limited to that shown in FIG. 15. Any configuration can be employed as long as the configuration employed can execute the functions of the modules described in the exemplary embodiments. For example, some modules may be configured by a specific purpose hardware (for example, ASIC: application specific integrated circuit) and other modules are located in an external system so that the modules are connected to each other by a communication line. Alternatively, a plurality of the system shown in FIG. 15 may be connected to each other by a communication line so that the systems can operate in a cooperating manner. In addition, the modules of the exemplary embodiment of the invention may be installed in a copier, a fax machine, a scanner, a printer, or a multi-functional device (an image processing apparatus having two or more functions of the scanner, printer, copier, fax machine, or the like).

In the above-described embodiments of the invention, the information-image detecting module 32 and the barcode decoding module 33 are separated from each other, and the process of the barcode decoding module 33 is performed after performing the process of the information-image detecting module 33. However, the information-image detecting module 32 and the barcode decoding module 33 may be combined with each other, and the barcode decoding process may be performed simultaneously with the barcode detecting process.

The processes related to the width of the bar may be substituted by the processes related to the width of the white bar, and vice versa.

The specific numeric value used in connection with the width ratio described in the exemplary embodiments of the invention may be adjusted to have a wide allowable range in consideration of noise.

The program may be provided as a recording medium storing the program or may be provided by a communication unit. In this case, the program may be embodied as the invention of "a computer-readable recording medium having a program recorded therein."

The term "a computer-readable recording medium having a program recorded therein" refers to a computer-readable recording medium having a program recorded therein, used for the purpose of install, execution or distribution of the program.

Examples of the recording medium include a DVD (digital versatile disc) of which the format includes "DVD-R, DVD-RW, and DVD-RAM", which are approved by the DVD Forum, and "DVD+R and DVD+RW", which are approved formats of DVD+RW; a CD (compact disc) such as CD-ROM (read only memory), CD-R (recordable), or CD-RW (rewritable); a magneto-optical disc (MO); a flexible disc (FD); a magnetic tape, a hard disc, a read only memory (ROM); an electrically erasable programmable read-only memory (EE-PROM), a flash memory, a random-access memory (RAM), and the like.

Part or the entire program may be recorded in the recording medium for the purpose of storage of distribution. Alternatively, the program may be transmitted via a transmission medium including, for example, a wired network that is used in a local area network (LAN), a metropolitan area network (MAN), a wide area network (WAN), an internet, an intranet, an extranet, or the like; a wireless communication network; or a combination of the wired network and the wireless communication network. Alternatively, the program may be embodied in a carrier wave.

The program may be a part of another program or may be recorded in a recording medium along with a separate program. Alternatively, the program may be partitioned into subprograms and the subprograms are recorded in a plurality of recording media. Moreover, the data recorded in the recording medium may be in any form including a compressed form and an encoded form as long as the data can be decompressed and decoded.

[FIG. 1]
   11: FIRST DETECTING MODULE
   12: SECOND DETECTING MODULE
   13: THIRD DETECTING MODULE
   32: INFORMATION-IMAGE DETECTING MODULE
[FIG. 2]
   21: FIRST DETERMINING MODULE
   22: SECOND DETERMINING MODULE
   23: THIRD DETERMINING MODULE
   24: FOURTH DETERMINING MODULE
   25: CANDIDATE AREA UPDATING MODULE
   26: FIFTH DETERMINING MODULE
   32: INFORMATION-IMAGE DETECTING MODULE
[FIG. 3]
   31: IMAGE INPUT MODULE
   32: INFORMATION-IMAGE DETECTING MODULE
   33: BARCODE DECODING MODULE
   34: DECODING RESULT PROCESSING MODULE
[FIG. 8]
   A. START
   B. END
   S201: SCAN INPUT IMAGE LINE BY LINE
   S202: DETECT SUBSEQUENT BAR
   S203: IS BAR OF INTEREST THE FIRST BAR IN BARCODE AREA?
   S204: ¼×MAXIMUM WIDTH OF BARS HAVING BEEN SCANNED BEFORE≦WIDTH OF BAR OF INTEREST≦4×MINIMUM WIDTH OF BARS HAVING BEEN SCANNED BEFORE?
   S205: ½×WIDTH OF PRECEDING BAR≦WIDTH OF WHITE BAR≦2×WIDTH OF PRECEDING BAR
   S206: DOES THE NUMBER OF BARS SCANNED MEET MINIMAL NUMBER-OF-BAR REQUIREMENT OF BARCODE?
   S207: WIDTH OF WHITE BAR RATIO≦1.5×MAXIMUM WIDTH OF WHITE BARS HAVING BEEN SCANNED BEFORE?
   S208: ADD BAR OF INTEREST AS BAR BELONGING TO CANDIDATE BARCODE AREA
   S209: DOES NEXT BAR EXIST ON SCANNING LINE?
   S210: DOES THE NUMBER OF BARS CONTAINED IN CANDIDATE AREA DETECTED SO FAR MEET THE MINIMAL NUMBER-OF-BAR REQUIREMENT OF BARCODE?
   S211: AREA DETECTED AS BAR OF BARCODE SO FAR IS SET TO CANDIDATE BARCODE AREA
   S212: DOES SUBSEQUENT BAR EXIST ON SCANNING LINE?
   S213: DOES SUBSEQUENT SCANNING LINE EXIST?
   S214: DOES BARCODE AREA OCCUPY PREDETERMINED PLURAL SUCCESSIVE LINES?
   S216: OUTPUT BARCODE AREA
   S217: BARCODE AREA NOT FOUND
[FIG. 9]
   A. TRANSPORT EXPENSE SETTLEMENT
   B. SUZUKI
   C. TANAKA
[FIG. 10]
   A. INVOICE
   B. DESTINATION
   C. TARO OO
   D. CLIENT
   E. JIRO XX
   F. STATEMENT OF DELIVERY
   G. ARTICLE
   H. ☆ SOFT LICENSE
   I. QUANTITY
   J. RECIPIENT
   K. T123-4567 CHIBA-KEN OO-SHI O-MACHI 11-1-1111 △◎ CORPORATION
   L. SENDER
   M. T123-4567 KANAGAWA-KEN OO-SHI O-MACHI 9-9-99 OX■ CORPORATION
[FIG. 11]
   111: TARGET-LINE SETTING MODULE
   21: FIRST DETERMINING MODULE

22: SECOND DETERMINING MODULE
23: THIRD DETERMINING MODULE
24: FOURTH DETERMINING MODULE
25: CANDIDATE-AREA UPDATING MODULE
116: FIFTH DETERMINING MODULE
1161: DISTRIBUTION-INFORMATION DETECTING MODULE
1162: COMPARISON MODULE
1163: BARCODE ADDING/GENERATING MODULE
32: INFORMATION-IMAGE DETECTING MODULE
[FIG. 12]
X. START
S1201: SCAN INPUT IMAGE EVERY N LINES
S1202: DETECT SUBSEQUENT BAR
S1203: IS BAR OF INTEREST THE FIRST BAR IN BARCODE AREA?
S1204: ¼×MAXIMUM WIDTH OF BARS HAVING BEEN SCANNED BEFORE≦WIDTH OF BAR IN QUESTION≦4×MINIMUM WIDTH OF BARS HAVING BEEN SCANNED BEFORE?
S1205: ½×WIDTH OF PRECEDING BAR≦WIDTH OF WHITE BAR≦2×WIDTH OF PRECEDING BAR
S1206: DOES THE NUMBER OF BARS SCANNED MEET MINIMAL NUMBER-OF-BAR REQUIREMENT OF BARCODE?
S1207: WIDTH OF WHITE BAR RATIO≦1.5×MAXIMUM WIDTH OF WHITE BARS HAVING BEEN SCANNED BEFORE?
S1208: ADD BAR OF INTEREST AS BAR BELONGING TO CANDIDATE BARCODE AREA
S1209: DOES NEXT BAR EXIST ON SCANNING LINE?
S1210: DOES THE NUMBER OF BARS CONTAINED IN CANDIDATE AREA DETECTED SO FAR MEET THE MINIMAL NUMBER-OF-BAR REQUIREMENT OF BARCODE?
S1211: AREA DETECTED AS BAR OF BARCODE SO FAR IS SET TO CANDIDATE BARCODE AREA
S1212: DOES SUBSEQUENT BAR EXIST ON SCANNING LINE?
[FIG. 13]
S1213: IS BARCODE CANDIDATE AREA DETECTED?
S1214: IS POSITIONAL COORDINATE, IN LATERAL DIRECTION, OF BARCODE CANDIDATE AREA BEING DETECTED IN CURRENT SCAN LINE WITHIN PREDETERMINED RANGE FROM THAT OF BARCODE CANDIDATE AREA BEING DETECTED IN PREVIOUS SCAN LINE?
S1215: OBTAIN DISTRIBUTION INFORMATION OF BARCODE CANDIDATE AREA OF PRECEDING SCAN LINES AND THAT OF BARCODE CANDIDATE AREA OF CURRENT SCAN LINE
S1216: IS DIFFERENCE BETWEEN DISTRIBUTION INFORMATION WITHIN PREDETERMINED RANGE?
S1217: ADD TO BARCODE CANDIDATE AREA OF PRECEDING SCAN LINES
S1218: IS THERE BARCODE CANDIDATE AREA THAT BELONGS TO BARCODE CANDIDATE AREA BEING DETECTED IN PRECEDING SCAN LINES BUT IS NOT CONNECTED TO BARCODE CANDIDATE AREA BEING DETECTED IN CURRENT SCAN LINE?
S1219: IS HEIGHT OF BARCODE CANDIDATE AREA BEING DETECTED SO FAR IS EQUAL TO OR LARGER THAN PREDETERMINED HEIGHT?
S1220: REGISTER AS BARCODE AREA
S1221: DOES SUBSEQUENT LINE EXIST?
Y. END
[FIG. 15]
1501: CPU
1502: ROM
1503: RAM
1505: BRIDGE
1507: INTERFACE
1508: KEYBOARD
1509: POINTING DEVICE
1510: DISPLAY
1511: HDD
1512: DRIVE
1513: REMOVABLE RECORDING MEDIUM
1514: CONNECTION PORT (USB ETC.)
1515: EXTERNAL CONNECTION DEVICE
1516: COMMUNICATION UNIT
1517: DATA READING UNIT (SCANNER)
1518: DATA OUTPUT UNIT

What is claimed is:

1. An image processing apparatus comprising:
a first detecting unit that detects a leading end portion of an information image that represents information using black image areas and white image areas, based on (i) a first criterion and (ii) a ratio of a width of a certain white image area in the information image to a width of a black image area, which is detected by scanning prior to the certain white image area, or a ratio of a width of a certain black image area in the information image to a width of a white image area, which is detected by scanning prior to the certain black image area; and
a second detecting unit that takes one of the black image areas and white image areas as an image area of interest and detects a portion other than the leading end portion, of the information image based on (i) a second criterion being different from the first criterion and (ii) at least one of ratios of a width of the image area of interest to widths of black image areas and white image areas, which are detected by scanning prior to the image area of interest,
wherein the second detecting unit detects the portion, other than the leading end portion, of the information image based on (i) the second criterion, (ii-a) a ratio of the width of the image area of interest to a maximum width of the black image areas and the white image areas, which are detected prior to the image area of interest and (ii-b) a ratio of the width of the image area of interest to a minimum width of the black image areas and the white image areas, which are detected prior to the image area of interest.

2. The image processing apparatus according to claim 1, wherein the first detecting unit detects the leading end portion of the information image based on (i) the first criterion and (ii) the ratio of the width of the certain white image area in the information image to the width of the black image area, which is detected prior to the certain white image area and which is adjacent to the certain white image area, or the ratio of the width of the certain black image area in the information image to the width of the white image area, which is detected prior to the certain black image area and which is adjacent to the certain black image area.

3. The image processing apparatus according to claim 1, further comprising:
a third detecting unit that detects number of black image areas or white image areas that are in the information image having the portion, which is other than the leading end portion and which is detected by the second detecting unit; and a fourth detecting unit that detects a trailing end portion of the information image in accordance with the number detected by the third detecting unit and based on (i) at least one of ratios of a width of a black or white image area that is detected by scanning subsequent to the image area of interest to widths of black image areas and white image areas, which are detected by scanning prior to the black or white image area subsequent to the image area of interest and which are in the information image having the portion, other than the leading end portion, detected by the second detecting unit and (ii) a third criterion being different from the first and second criteria.

4. The image processing apparatus according to claim 3, further comprising:

a decoding unit that decodes the information image when the fourth detecting unit detects the trailing end portion.

5. The image processing apparatus according to claim 3, further comprising:

a target-line setting unit that sets a line, to be scanned, of the image;

a distribution-information detecting unit, wherein after the fourth detecting unit detects the trailing end portion, the distribution-information detecting unit detects information relating to a distribution of the black image areas or the white image areas between the leading end portion detected by the first detecting unit and the trailing end portion detected by the fourth detecting unit; and an information-image adding/generating unit that adds a portion between the leading end portion and the trailing end portion, which are detected in a line to be currently scanned, to an information image being generated from lines which have been scanned before based on the information, which relates to the distribution and which is detected by the distribution-information detecting unit, so as to generate an updated information image.

6. The image processing apparatus according to claim 5, further comprising:

a comparison module that compares the information, which relates to the distribution and which is detected by the distribution-information detecting unit, with information relating to a distribution of the information image being generated from the lines which have been scanned before, wherein the information-image adding/generating unit generates the updated information image based on a comparison result of the comparison unit.

7. A non-transitory computer-readable medium storing a program that causes a computer to execute image processing, the image processing comprising:

(i) detecting a leading end portion of an information image that represents information using black image areas and white image areas, based on (a) a first criterion and (b) a ratio of a width of a certain white image area in the information image to a width of a black image area, which is detected prior to the certain white image area, or a ratio of a width of a certain black image area in the information image to a width of a white image area, which is detected prior to the certain black image area; and (ii) taking one of the black image areas and white image areas as an image area of interest and detecting a portion other than the leading end portion, of the information image based on (a) a second criterion being different from the first criterion and (b) at least one of ratios of a width of the image area of interest to widths of black image areas and white image areas, which are detected prior to the image area of interest, wherein the detecting of the step (ii) detects the portion, other than the leading end portion, of the information image based on (a) the second criterion, (b-1) a ratio of the width of the image area of interest to a maximum width of the black image areas and the white image areas, which are detected prior to the image area of interest and (b-2) a ratio of the width of the image area of interest to a minimum width of the black image areas and the white image areas, which are detected prior to the image area of interest.

8. The non-transitory computer-readable medium according to claim 7, wherein the detecting of the step (i) detects the leading end portion of the information image based on (a) the first criterion and (b) the ratio of the width of the certain white image area in the information image to the width of the black image area, which is detected prior to the certain white image area and which is adjacent to the certain white image area, or the ratio of the width of the certain black image area in the information image to the width of the white image area, which is detected prior to the certain black image area and which is adjacent to the certain black image area.

9. The non-transitory computer-readable medium according to claim 7, wherein the image processing further comprises:

(iii) detecting number of black image areas or white image areas that are in the information image having the detected portion, which is other than the leading end portion; and (iv) detecting a trailing end portion of the information image in accordance with the number detected and based on (a) at least one of ratios of a width of a black or white image area that is detected subsequent to the image area of interest to widths of black image areas and white image areas, which are detected prior to the black or white image area subsequent to the image area of interest and which are in the information image having the detected portion, other than the leading end portion, and (b) a third criterion being different from the first and second criteria.

10. The non-transitory computer-readable medium according to claim 9, wherein the image processing further comprises setting a line, to be scanned, of the image, the image processing further comprises:

after the detecting of the step (iv) detects the trailing end portion, detecting information relating to a distribution of the black image areas or the white image areas between the detected leading end portion and the detected trailing end portion; and adding a portion between the leading end portion and the trailing end portion, which are detected in a line to be currently scanned, to an information image being generated from lines which have been scanned before based on the detected information relating to the distribution, so as to generate an updated information image.

11. The non-transitory computer-readable medium according to claim 10, wherein the image processing further comprises comparing the detected information relating to the distribution with information relating to a distribution of the information image being generated from the lines which have been scanned before, and the adding generates the updated information image based on a result of the comparing.

12. The non-transitory computer-readable medium according to claim 7, wherein the image processing further comprises:

decoding the information image when the fourth detecting unit detects the trailing end portion.

* * * * *